(12) United States Patent
Kumari et al.

(10) Patent No.: US 10,081,847 B2
(45) Date of Patent: Sep. 25, 2018

(54) METHOD FOR METAL PRODUCTION

(71) Applicant: University of Bradford, Bradford, Yorkshire (GB)

(72) Inventors: Jeya Kumari, Bradford (GB); Raj Patel, Bradford (GB)

(73) Assignee: UNIVERSITY OF BRADFORD, Bradford, Yorkshire (GB)

( * ) Notice: Subject to any disclaimer, the term of this patent is extended or adjusted under 35 U.S.C. 154(b) by 77 days.

(21) Appl. No.: 14/435,864

(22) PCT Filed: Oct. 17, 2013

(86) PCT No.: PCT/GB2013/052719
§ 371 (c)(1),
(2) Date: Apr. 15, 2015

(87) PCT Pub. No.: WO2014/060766
PCT Pub. Date: Apr. 24, 2014

(65) Prior Publication Data
US 2015/0292057 A1    Oct. 15, 2015

(30) Foreign Application Priority Data

Oct. 17, 2012    (GB) .................................. 1218675.5

(51) Int. Cl.
*C22B 3/04*    (2006.01)
*C22B 1/02*    (2006.01)
(Continued)

(52) U.S. Cl.
CPC .................. *C22B 3/04* (2013.01); *C22B 1/02* (2013.01); *C22B 5/04* (2013.01); *C22B 34/00* (2013.01);
(Continued)

(58) Field of Classification Search
CPC .. C22B 3/04; C22B 1/02; C22B 59/00; C22B 34/14; C22B 34/10; C22B 34/20
See application file for complete search history.

(56) References Cited

U.S. PATENT DOCUMENTS

| 4,681,623 A | 7/1987 | Okajima et al. |
| 6,558,447 B1 * | 5/2003 | Shekhter ................. B22F 9/023 75/245 |
| 2010/0313709 A1 | 12/2010 | Ikarashi et al. |

FOREIGN PATENT DOCUMENTS

| GB | 665222 A | 1/1952 |
| GB | 675933 A | 7/1952 |

(Continued)

OTHER PUBLICATIONS

Human translation of JP 04191342, 1992.*
(Continued)

*Primary Examiner* — Matthew E Hoban
(74) *Attorney, Agent, or Firm* — Nexsen Pruet, PLLC; E. Eric Mills

(57) ABSTRACT

The invention provides a method for the production of a metal, the method comprising the steps of mixing an oxide of the metal with a reducing agent comprising a Group II metal or a hydride thereof in the presence of water and/or an organic solvent, heating the mixture of oxide and reducing agent, leaching the resulting material with water; and washing the leached material with a dilute aqueous acid. Typically, the metal is a transition or rare earth metal, the oxide of the metal is an oxide of a transition or rare earth metal, and the reducing agent is selected from calcium or magnesium or the hydrides of calcium and magnesium. The metal is generally obtained at a purity of around 98.5-99.1%, and the method is much quicker than the methods of the prior art and has a much lower carbon footprint, thereby providing an option which is more sustainable, environmentally friendly, and accommodative for industries. Particularly good results are observed in the production of transition metals such as titanium, tantalum and niobium.

19 Claims, 28 Drawing Sheets

XRF PATTERN OF TITANIUM PREPARED ACCORDING TO THE METHOD OF THE INVENTION

(51) Int. Cl.
    *C22B 5/04*     (2006.01)
    *C22B 34/00*     (2006.01)
    *C22B 34/12*     (2006.01)
    *C22B 34/10*     (2006.01)
    *C22B 34/14*     (2006.01)
    *C22B 34/20*     (2006.01)
    *C22B 59/00*     (2006.01)

(52) U.S. Cl.
    CPC .......... *C22B 34/10* (2013.01); *C22B 34/1236* (2013.01); *C22B 34/1268* (2013.01); *C22B 34/14* (2013.01); *C22B 34/20* (2013.01); *C22B 59/00* (2013.01)

(56) References Cited

FOREIGN PATENT DOCUMENTS

| | | | |
|---|---|---|---|
| GB | 2158102 A | 11/1985 | |
| JP | 50025882 A | 3/1975 | |
| JP | 04191342 A | 7/1992 | |
| JP | 2006249449 A | 9/2006 | |
| JP | 2011514435 A1 | 7/2009 | |
| WO | 2004042095 A1 | 5/2004 | |
| WO | 2006089222 A2 | 8/2006 | |
| WO | 2010036131 A1 | 4/2010 | |
| WO | WO 2010036131 A1 * | 4/2010 | ............. C22C 14/00 |

OTHER PUBLICATIONS

Won, C. W. et al., "Titanium Powder Prepared by a Rapid Exothermic Reaction," Chemical Engineering Journal, Feb. 15, 2010, pp. 270-275, vol. 157, No. 1, Elsevier Sequoia, Lausanne, CH.

\* cited by examiner

XRF PATTERN OF TITANIUM PREPARED ACCORDING TO THE
METHOD OF THE INVENTION

XRF PATTERN OF A STANDARD TITANIUM SAMPLE

SEM MICROGRAPH AND CORRESPONDING EDX SPECTRUM OF $TiO_2$ POWDER USED FOR REDUCTION ACCORDING TO THE METHOD OF THE INVENTION

SEM MICROGRAPH AND CORRESPONDING EDX SPECTRUM OF TITANIUM METAL OBTAINED AFTER 5 HOURS OF REDUCTION ACCORDING TO THE METHOD OF THE INVENTION

SEM MICROGRAPH AND CORRESPONDING EDX SPECTRUM OF TITANIUM METAL OBTAINED AFTER REDUCTION AND LEACHING ACCORDING TO THE METHOD OF THE INVENTION

XRD PATTERN OF TITANIUM METAL PRODUCED AFTER REDUCTION AND LEACHING ACCORDING TO THE METHOD OF THE INVENTION

XRD PATTERN OF TITANIUM DIOXIDE USED FOR REDUCTION ACCORDING TO THE METHOD OF THE INVENTION

RAMAN SPECTRUM OF TITANIUM DIOXIDE POWDER (ANATASE FORM)

RAMAN SPECTRUM OF TITANIUM METAL PRODUCED AFTER
REDUCTION AND LEACHING ACCORDING TO THE METHOD OF THE INVENTION

SEM MICROGRAPH AND CORRESPONDING EDX SPECTRUM OF
REDUCED $TiO_2$ OBTAINED AFTER 5 HOURS OF REDUCTION ACCORDING TO THE
SCALED-UP METHOD OF THE INVENTION

SEM MICROGRAPH AND CORRESPONDING EDX SPECTRUM OF
TITANIUM SPONGE OBTAINED AFTER LEACHING REDUCED $TiO_2$ OBTAINED FROM
THE SCALED-UP METHOD OF THE INVENTION

SEM MICROGRAPH AND CORRESPONDING EDX SPECTRUM OF $Ta_2O_5$ POWDER USED FOR REDUCTION ACCORDING TO THE METHOD OF THE INVENTION

SEM MICROGRAPH AND CORRESPONDING EDX SPECTRUM OF REDUCED $Ta_2O_5$ OBTAINED AFTER 5 HOURS OF REDUCTION ACCORDING TO THE METHOD OF THE INVENTION

ELEMENTAL EDX MAP OF REDUCED Ta$_2$O$_5$ SAMPLE

SEM MICROGRAPH AND CORRESPONDING EDX SPECTRUM OF TANTALUM SPONGE OBTAINED AFTER LEACHING REDUCED $Ta_2O_5$

O Ka1  Ta La1

ELEMENTAL EDX MAP OF TANTALUM SPONGE

SEM MICROGRAPH AND CORRESPONDING EDX SPECTRUM OF $Nb_2O_5$ POWDER USED FOR REDUCTION ACCORDING TO THE METHOD OF THE INVENTION

SEM MICROGRAPH AND CORRESPONDING EDX SPECTRUM OF
REDUCED $Nb_2O_5$ OBTAINED AFTER 5 HOURS OF REDUCTION ACCORDING TO THE
METHOD OF THE INVENTION

ELEMENTAL EDX MAP OF REDUCED $Nb_2O_5$ SAMPLE

SEM MICROGRAPH AND CORRESPONDING EDX SPECTRUM OF NIOBIUM SPONGE OBTAINED AFTER LEACHING REDUCED $Nb_2O_5$

ELEMENTAL EDX MAP OF NIOBIUM SPONGE

SEM MICROGRAPH AND CORRESPONDING EDX SPECTRUM OF $HfO_2$ POWDER USED FOR REDUCTION ACCORDING TO THE METHOD OF THE INVENTION

SEM MICROGRAPH AND CORRESPONDING EDX SPECTRUM OF REDUCED $HfO_2$ OBTAINED AFTER 5 HOURS OF REDUCTION ACCORDING TO THE METHOD OF THE INVENTION

SEM MICROGRAPH AND CORRESPONDING EDX SPECTRUM OF HAFNIUM SPONGE OBTAINED AFTER LEACHING REDUCED $HfO_2$

SEM MICROGRAPH AND CORRESPONDING EDX SPECTRUM OF $ZrO_2$ POWDER USED FOR REDUCTION ACCORDING TO THE METHOD OF THE INVENTION

SEM MICROGRAPH AND CORRESPONDING EDX SPECTRUM OF REDUCED $ZrO_2$ OBTAINED AFTER 5 HOURS OF REDUCTION ACCORDING TO THE METHOD OF THE INVENTION

ELEMENTAL EDX MAP OF REDUCED ZrO$_2$ SAMPLE

SEM MICROGRAPH AND CORRESPONDING EDX SPECTRUM OF ZIRCONIUM SPONGE OBTAINED AFTER LEACHING REDUCED $ZrO_2$

ELEMENTAL EDX MAP OF ZIRCONIUM SPONGE

METHOD FOR METAL PRODUCTION

CROSS REFERENCE TO RELATED APPLICATIONS

This application is a 35 U.S.C. § 371 U.S. national phase entry of International Application No. PCT/GB2013/052719 having an international filing date of Oct. 17, 2013, which claims the benefit of Great Britain Application No. 1218675.5 filed Oct. 17, 2012, each of which is incorporated herein by reference in its entirety.

FIELD OF THE INVENTION

This invention relates to a new and improved method for the production of metals. More specifically, the method facilitates the preparation of high purity metals, especially transition and rare earth metals, from their oxides by a simple reductive technique which avoids the difficult, time-consuming and energy intensive processing of the prior art and the attendant disadvantages of using and producing corrosive and volatile substances.

BACKGROUND TO THE INVENTION

The production of metals, such as transition and rare earth metals, has always presented several technical challenges. With specific reference to a particularly useful transition metal, titanium is the ninth most abundant element and possesses unique and desirable properties, such as high melting point, high corrosion resistance and the ability to form lightweight alloys, but it has not been used widely owing to its production costs. Titanium dioxide, which finds widespread use as a white pigment in paints, is readily available in the Earth's crust, but the separation of titanium metal from the oxygen in titanium dioxide has traditionally presented several challenges, in terms of time and energy requirements and handling difficulties associated with corrosive and volatile reagents and by-products.

Typically, the extraction of highly reactive metals requires the use of expensive electrolysis methods[1-15]. The most commonly used processes for the production of titanium, however, are reductive processes. The Kroll process uses ilmenite or rutile as a starting material and this is carbo-chlorinated to obtain titanium tetrachloride, which is then reduced using magnesium metal. The magnesium chloride which is thus obtained is separated by distillation. This process, however, is time-consuming and takes several days for completion. Hunter's process is similar to the Kroll process, but uses sodium, rather than magnesium, to effect the reduction of titanium tetrachloride. The FFC process, which was developed at the University of Cambridge, is also extremely time-consuming and involves the reduction of titanium dioxide pellets in a molten calcium chloride bath. However, despite extensive development work over a period of years, this process still fails to achieve complete removal of the oxide layer[16,17].

Alternative lengthy on-going research efforts have also failed to arrive at a cheaper production route. Several researchers, for example, have attempted electro-deposition of titanium from ionic solutions but have faced difficulties in eliminating multivalent titanium ions and highly reactive dendrite products[4-8].

Reductive processes for the manufacture of titanium metal from titanium dioxide typically encounter difficulties associated with the presence of various lower oxides or Magnéli phases in the $TiO_2$, since titanium can exist in several oxidation states that make the reduction more complicated and difficult. The present inventors have, however, successfully addressed this issue and have effectively reduced all the lower oxidation states of titanium, thereby allowing for the production of very high purity titanium metal.

Specifically, the inventors have examined the direct de-oxidation of titanium dioxide using calcium metal in order to produce titanium metal and have provided a process which is simple and rapid when compared with conventional methods and facilitates the production of titanium metal which is free from oxygen impurity whilst allowing for massive reductions in production costs. The approach which has been developed has been found to be applicable to the production of a wide range of other metals, most particularly other transition and rare earth metals.

SUMMARY OF THE INVENTION

Thus, according to the present invention, there is provided a method for the production of metals, said method comprising the steps of:
(a) mixing an oxide of the metal in a receptacle with a reducing agent comprising a Group II metal or a hydride thereof in the presence of water and/or an organic solvent;
(b) heating the mixture of an oxide of the metal and a reducing agent;
(c) leaching the resulting material with water; and
(d) washing the leached material with a dilute aqueous acid.

Typically, the metal is a transition metal or a rare earth metal and the oxide of the metal is an oxide of a transition metal or an oxide of a rare earth metal.

Most commonly, the metal is a transition metal, examples of which include titanium, tantalum, niobium, hafnium and zirconium, and suitable oxides of the metals may, for example, be selected from titanium dioxide, tantalum pentoxide, niobium pentoxide, hafnium dioxide and zirconium dioxide.

The heating process is typically carried out in a chamber or furnace. A particularly suitable temperature of reaction is in the region of from 750 to 1100° C., typically from 800° to 1000° C., for example about 900° C. and the heat treatment may typically be carried out for a period of from 2 to 8 hours, most suitably about 3 to 7 hours, for example about 5 hours. A pressure of 0 to $10^{-3}$ mbar may suitably be employed. The reducing agent is optimally selected from calcium or magnesium or the hydrides of calcium and magnesium. The metal oxide and reducing agent are mixed together in the presence of water or an organic solvent and, in certain embodiments of the invention, the resulting mixture is dried under vacuum prior to reduction.

Any organic solvent may be used for the purpose of mixing including, for example, alcohols, aldehydes, ketones, ethers, esters, alkanes or cycloalkanes. Specific examples of solvents include methanol, ethanol, butanol, isopropyl alcohol, isobutyl alcohol, ethylene glycol, glycerol, propylene glycol, amyl alcohol, cetyl alcohol, sorbitol, cyclohexane-1,2,3,4,5,6-hexol, menthol, formaldehyde, acetaldehyde, cinnamaldehyde, glucose, fructose, acetophenone, benzo-phenone, acetone, acetyl acetone, cycloproponone, methyl vinyl ketone, cyclobutanone, dimethyl ether, diethyl ether, dioxane, tetrahydrofuran, anisole, crown ethers, butyl acetate, lactones, hexane and cyclohexane.

The mass ratio of metal oxide to reducing agent is typically in the range of from 1:10 to 10:1, more typically from 1:5 to 4:1.

The subsequent leaching treatment with water after reduction may conveniently be performed at ambient temperatures, typically between 15 and 30° C., generally for between 30 minutes and 3 hours.

Washing of the leached material is carried using dilute aqueous mineral acids, including inorganic acids such as hydrochloric, sulphuric, phosphoric or nitric acid. The acids are generally used at concentrations of between 0.01 and 3M. Washing is typically performed at ambient temperatures, typically between 15 and 30° C. A particularly suitable acid for the leaching treatment in the case of titanium metal is 0.01-0.05M hydrochloric acid, and the metal is generally obtained at a purity of around 98.5-99.1%.

Thus, the method involves direct reduction of the oxides of metals with Group II metals or their hydrides which are optimally selected from calcium, magnesium, calcium hydride and magnesium hydride and the reductive process involves the complete removal of oxygen ions from the metal oxide, e.g. titanium dioxide. The time taken for the reduction to be completed is much lower than for the methods of the prior art, and the process has a much lower carbon footprint than known processes and, as a consequence, is more sustainable, environmentally friendly, and accommodative for industries.

The present method is also advantageous since it involves a direct solid state reduction process which, particularly in the case of titanium, yields high purity solid metal (sponge) by complete removal of the oxide layer from the metal oxide. By way of contrast, most of the methods of the prior art produce liquid titanium.

BRIEF DESCRIPTION OF THE DRAWINGS

Embodiments of the invention are further described hereinafter with reference to the accompanying drawings, in which.

DESCRIPTION OF THE INVENTION

The present invention provides a process for the production of a metal as hereinbefore defined. The process is particularly suited to the production of transition metals, such as titanium, tantalum, niobium, hafnium and zirconium metals, and of rare earth metals.

In the case of titanium, the process typically comprises the steps of mixing titanium dioxide with a reducing agent comprising a Group II metal or a hydride thereof in the presence of water and/or an organic solvent, drying the mixture under vacuum, heating the dried mixture at a temperature in the region of from 750 to 1100° C. for a period of from 2 to 8 hours whilst maintaining partial pressure conditions of 0 to $10^{-3}$ mbar, and treating the resulting material with an aqueous acidic liquor.

Thus, in a typical experimental procedure, about 1 to 10 g of titanium dioxide (anatase, available from VWR International) was mixed with about 0.5 to 50 g of calcium or magnesium metal or calcium hydride or magnesium hydride using water or any organic solvent (e.g. alcohols, ketones, ethers, hexane or cyclohexane) to aid the mixing process. The resulting mixture was dried under vacuum, transferred to a reducing boat, and loaded into a furnace. Reduction was then carried out at 900° C. under low pressure (0 to $10^{-3}$ mbar) for 5 hours. The contents of the reducing boat were taken out of the furnace, leached with water and then washed with 0.05M hydrochloric acid. The resulting sample after leaching and washing was dried and analysed to obtain the percentage purity value for the titanium metal which was formed.

Details of the quantitative analysis of four titanium samples prepared according to the method of the invention are shown in Table 1. It should be noted that the leaching time applied in the case of Sample 2 was insufficient, resulting in a higher level of residual calcium and thereby emphasising the essential nature of this step of the process.

TABLE 1

Analysis of Titanium Samples Prepared According to the Invention

| Constituents | Sample 1 | Sample 2 | Sample 3 | Sample 4 |
|---|---|---|---|---|
| Titanium | 98.78% | 96.96% | 98.46% | 99.1% |
| Calcium | 0.70% | 2.3% | 1.54% | 0.90% |
| Aluminium | 0.52% | | | |

Further analytical tests were conducted on samples of titanium metal prepared according to the claimed method, the techniques involved being X-ray fluorescence (XRF), scanning electron microscopy (SEM), energy-dispersive X-ray spectroscopy (EDX), X-ray diffraction (XRD) and Raman spectroscopy. The results of these studies will now be discussed with reference to accompanying FIGS. 1-4.

Figure 1A:
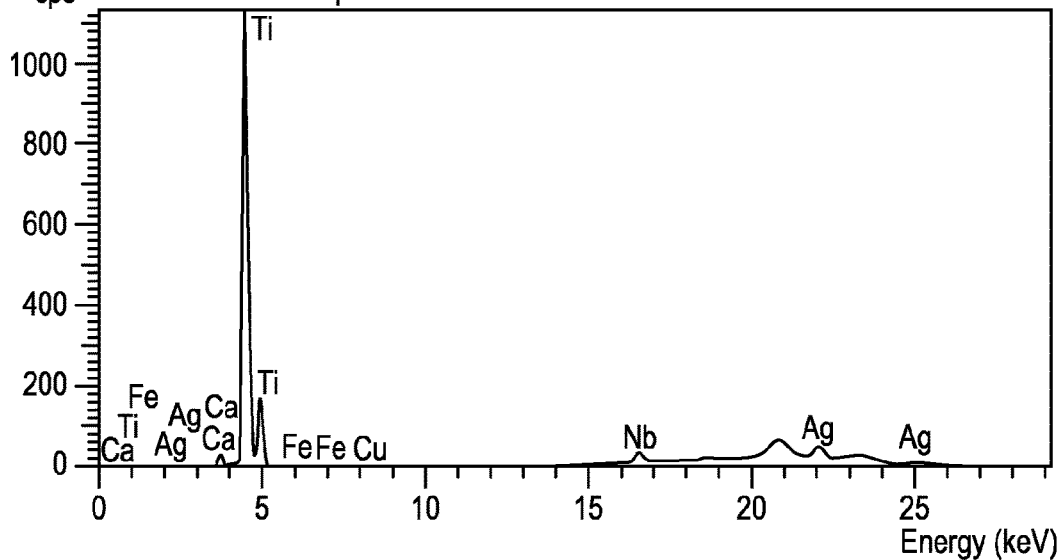
FIG. 1(a) is the XRF pattern of titanium prepared according to the method of the invention.
Figure 1B:
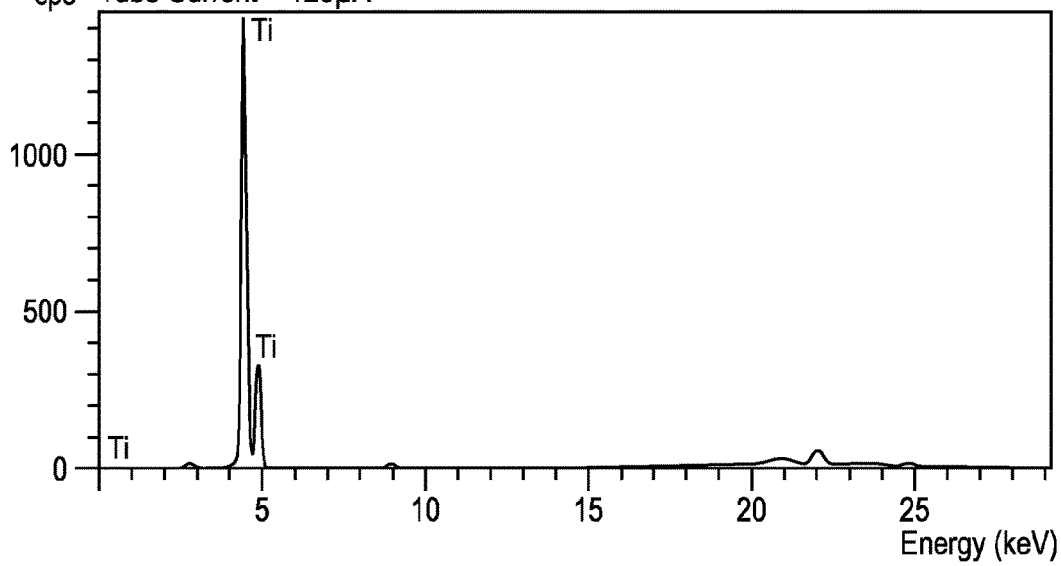
FIG. 1(b) is the XRF pattern of a standard titanium sample.

Thus, FIGS. 1(a) and 1(b) show the XRF analysis patterns for a sample of titanium metal produced according to the method of the invention and for a reference sample of standard titanium metal, and it can be seen that the XRF pattern for the titanium metal produced by the claimed method is almost identical to that of the reference sample of titanium, albeit with some trace impurities.

From the XRF analysis it is clear that both spectra are almost identical and, therefore, the purity value indicated by EDX is in close agreement to that obtained by quantitative analysis (>98%). Furthermore, a small titanium peak is observed at 9.04 eV, indicating that the metal produced by the claimed method is pure. This peak is produced as a result of the excitation of the electrons in the inner orbits.

Figure 2A:
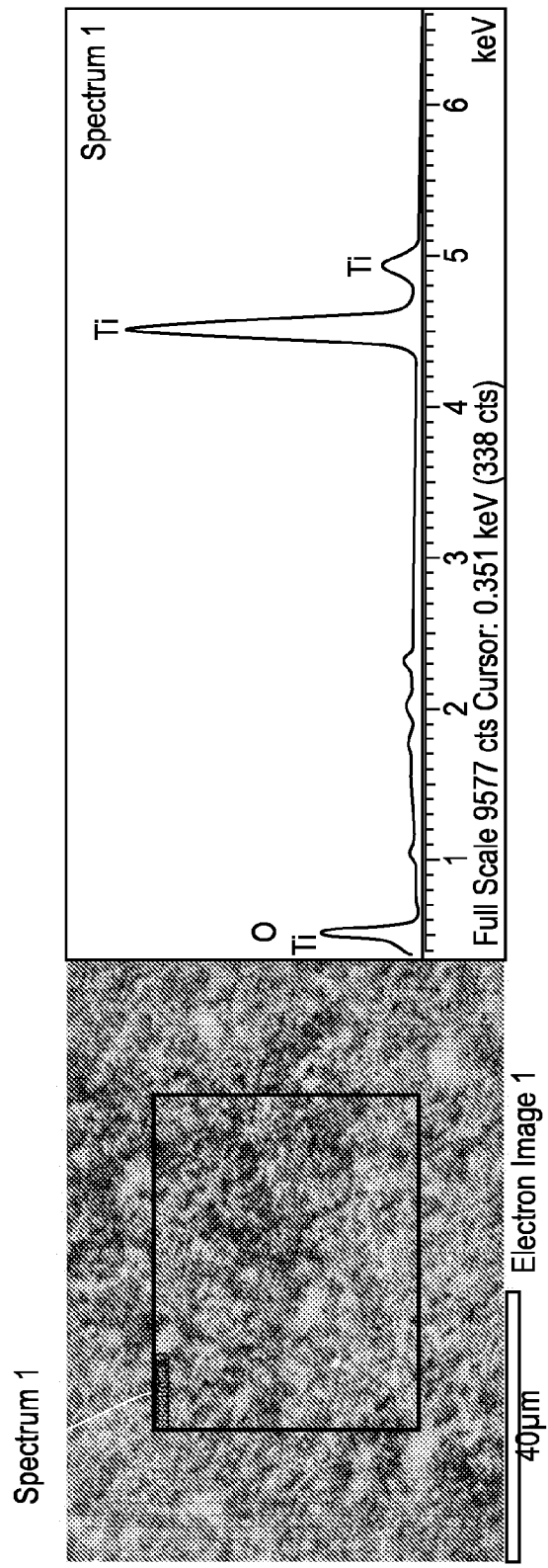
FIG. 2(a) is an SEM micrograph and corresponding EDX spectrum of $TiO_2$ powder used for reduction according to the method of the invention.
Figure 2B:
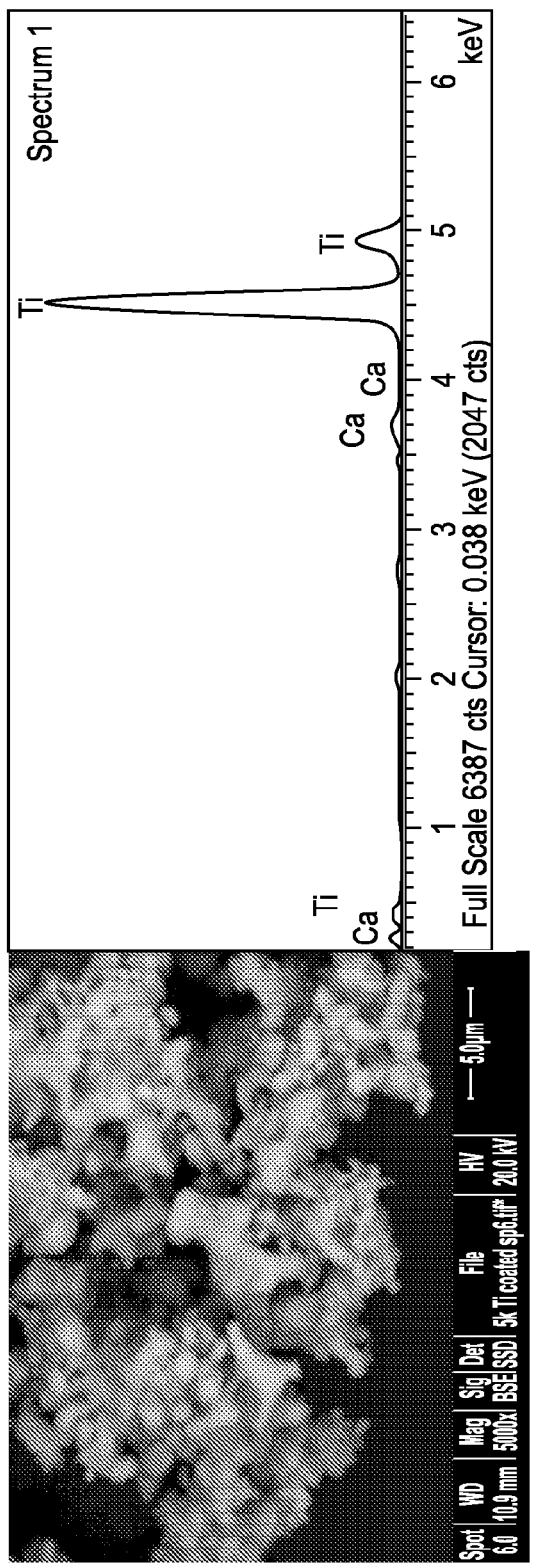
FIG. 2(b) is an SEM micrograph and corresponding EDX spectrum of titanium metal obtained after 5 hours of reduction according to the method of the invention.
Figure 2C:
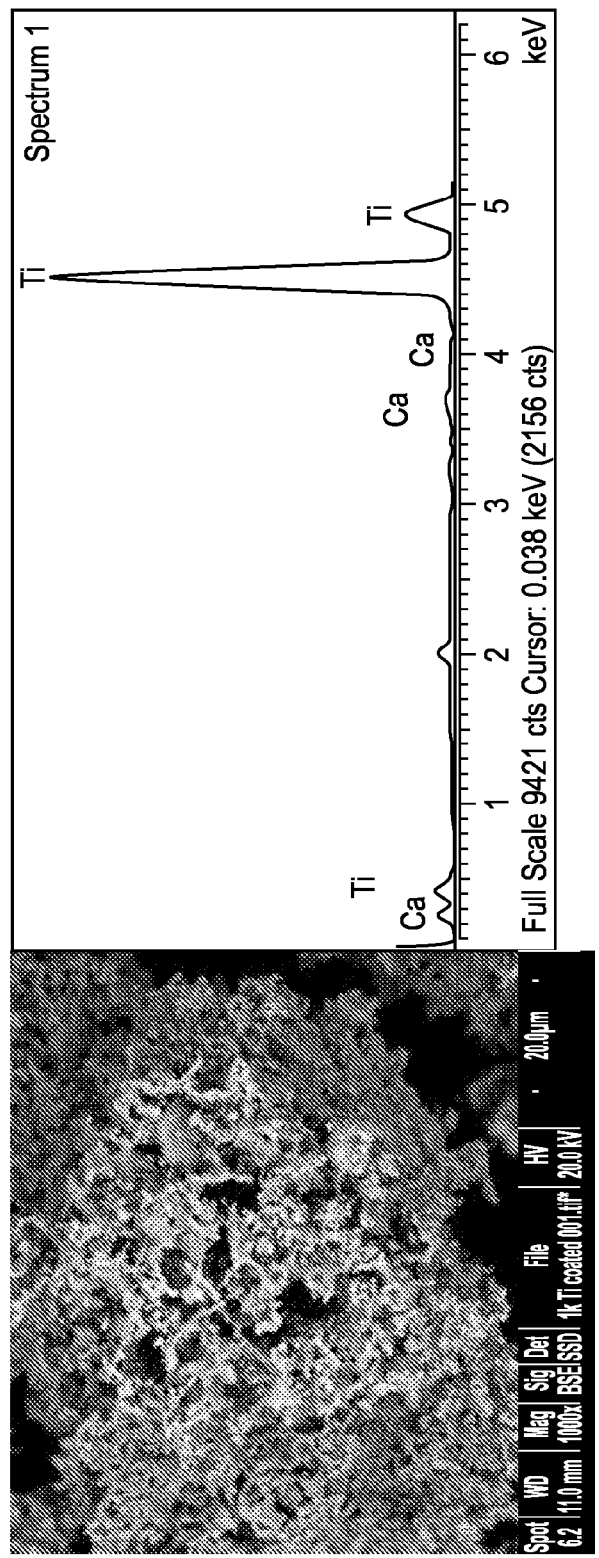
FIG. 2(c) is an SEM micrograph (at high and low magnification) and corresponding EDX spectrum of titanium metal obtained after reduction and leaching according to the method of the invention.

Further characterisation studies were carried out using SEM and EDX and the results of these studies are shown in FIGS. 2(a), 2(b) and 2(c), which present data in respect of a titanium dioxide sample used for the reduction process, a titanium metal sample obtained after 5 hours of reduction according to the claimed method, and a titanium metal sample obtained after reduction and leaching according to the claimed method. The corresponding derived analysis reports relating to three of these samples are shown in Tables 2, 3 and 4

TABLE 2

Analytical Data for $TiO_2$ Sample depicted in FIG. 2(a)

| Element | Weight % | Atomic % |
|---|---|---|
| O K | 68.13 | 79.26 |
| Ti K | 53.37 | 20.74 |
| Totals | 121.50 | |

TABLE 3

Analytical Data for Reduced Titanium Dioxide Sample depicted in FIG. 2(b)

| Element | Weight % | Atomic % |
|---|---|---|
| O K | 7.33 | 49.90 |
| Ca K | 5.91 | 16.06 |
| Ti K | 14.97 | 34.03 |
| Totals | 28.21 | |

TABLE 4

Analytical Data for Prepared Titanium Sample (after Reduction and Leaching) depicted in FIG. 2(c)

| Element | Weight % | Atomic % |
|---|---|---|
| Ca K | 0.43 | 0.90 |
| Ti K | 57.16 | 99.10 |
| Totals | 57.59 | |

From these studies, it is observed that the original $TiO_2$ sample contained 20.74% titanium and 79.26% oxygen and, after reduction, it was found that 34.0% titanium and 49.0% oxygen was present in the sample. After leaching, it was found that 99.10% titanium was present in the sample with no oxygen peak present. This indicates that all the oxygen had been removed from the titanium dioxide. In FIG. 2(b), the formation of titanium nodules (bright spots) on the calcium oxide matrix (grey areas) is clearly observed in the SEM micrograph and the intensity of the titanium peak can be seen in the EDX spectrum.

From these experimental results, it is evident that the disclosed method provides a new and alternative route for the production of Ti metal which is capable of removing all the oxygen from $TiO_2$, and the claimed method is applicable to the reduction of other metal oxides and may find widespread application in many industries.

Figure 3A:
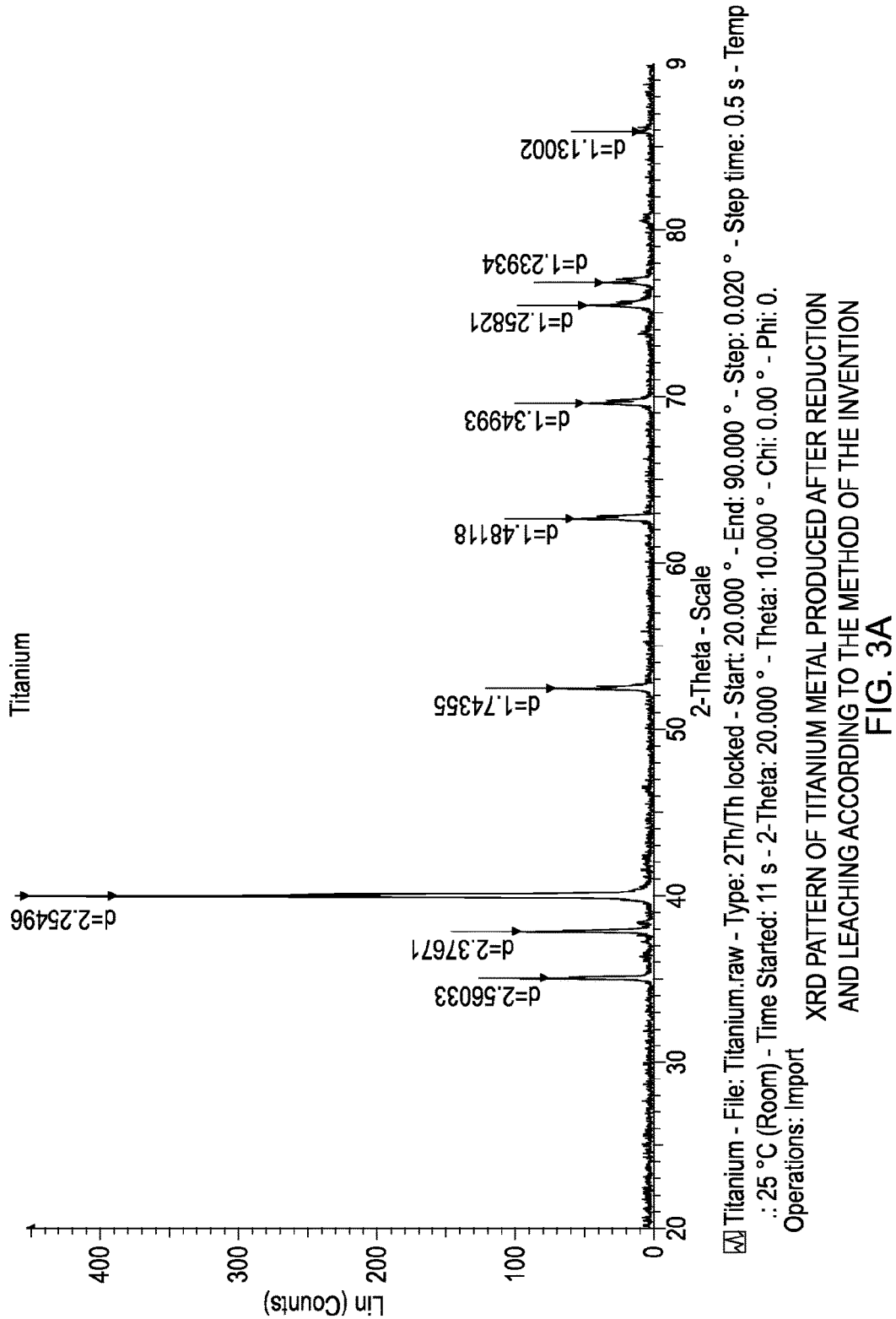
FIG. 3(a) is an XRD pattern of titanium metal produced after reduction and leaching according to the method of the invention.
Figure 3B:
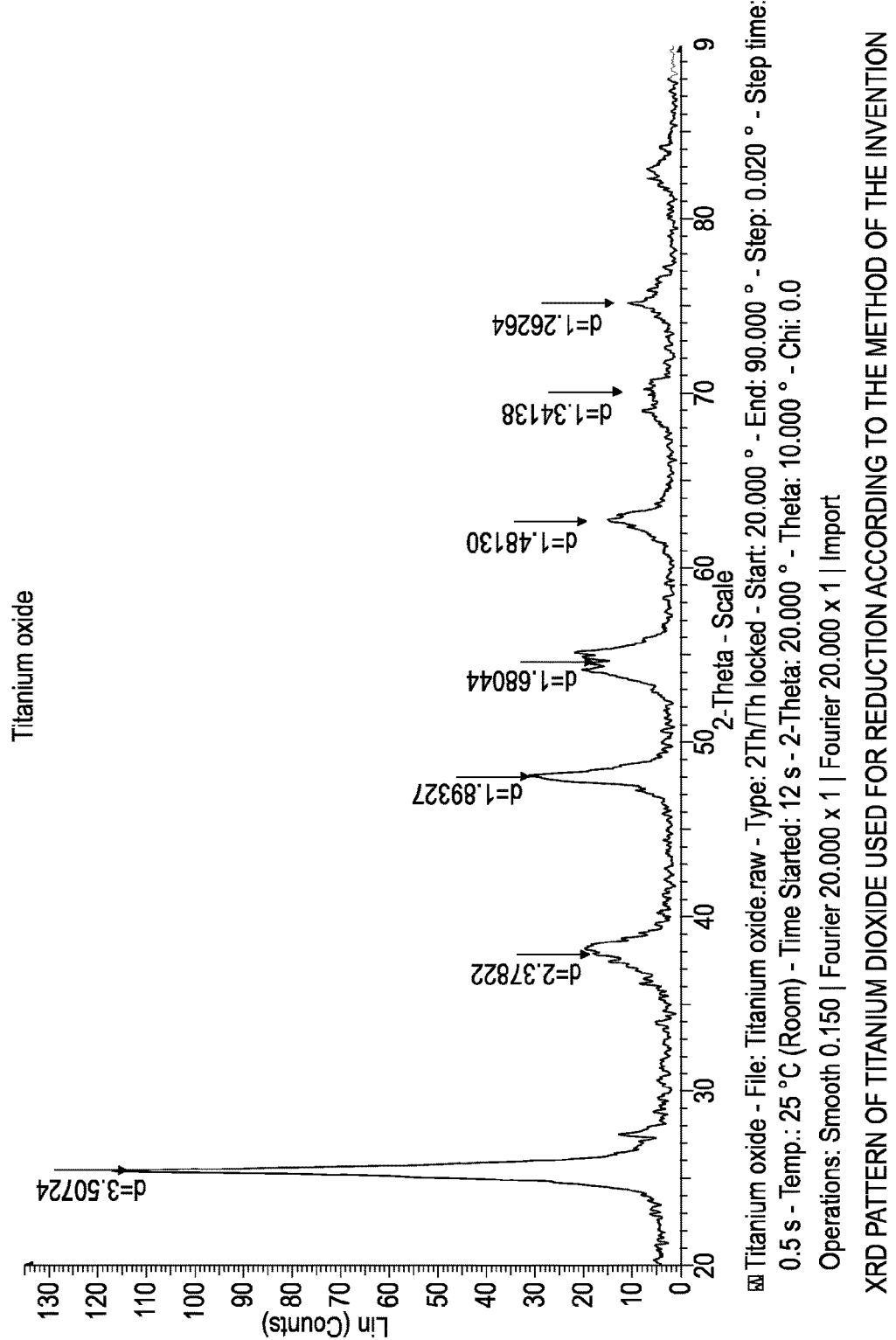
FIG. 3(b) is an XRD pattern of titanium dioxide used for reduction according to the method of the invention.

Turning to FIGS. 3(a) and 3(b), these respectively show the XRD patterns obtained for the titanium metal produced after reduction and leaching of the titanium dioxide according to the method of the invention, and of the titanium dioxide starting material used in the reduction. On analysing the diffraction pattern, it is found that all the titanium oxide phase has been completely transformed to titanium metal phase. The titanium dioxide corresponds to the anatase form which is used for the study. In FIG. 3(a) all the d-values corresponding to titanium metal can be seen without any evidence of the presence of lower oxides of titanium, d being the distance between atomic layers in a crystal, or the spacing between the planes in an atomic lattice. Thus, the metal formed is seen to be in a pure state, which is α-titanium phase, thereby providing further confirmation of the quantitative analysis data acquired by means of XRF and SEM-EDX.

Figure 4A:
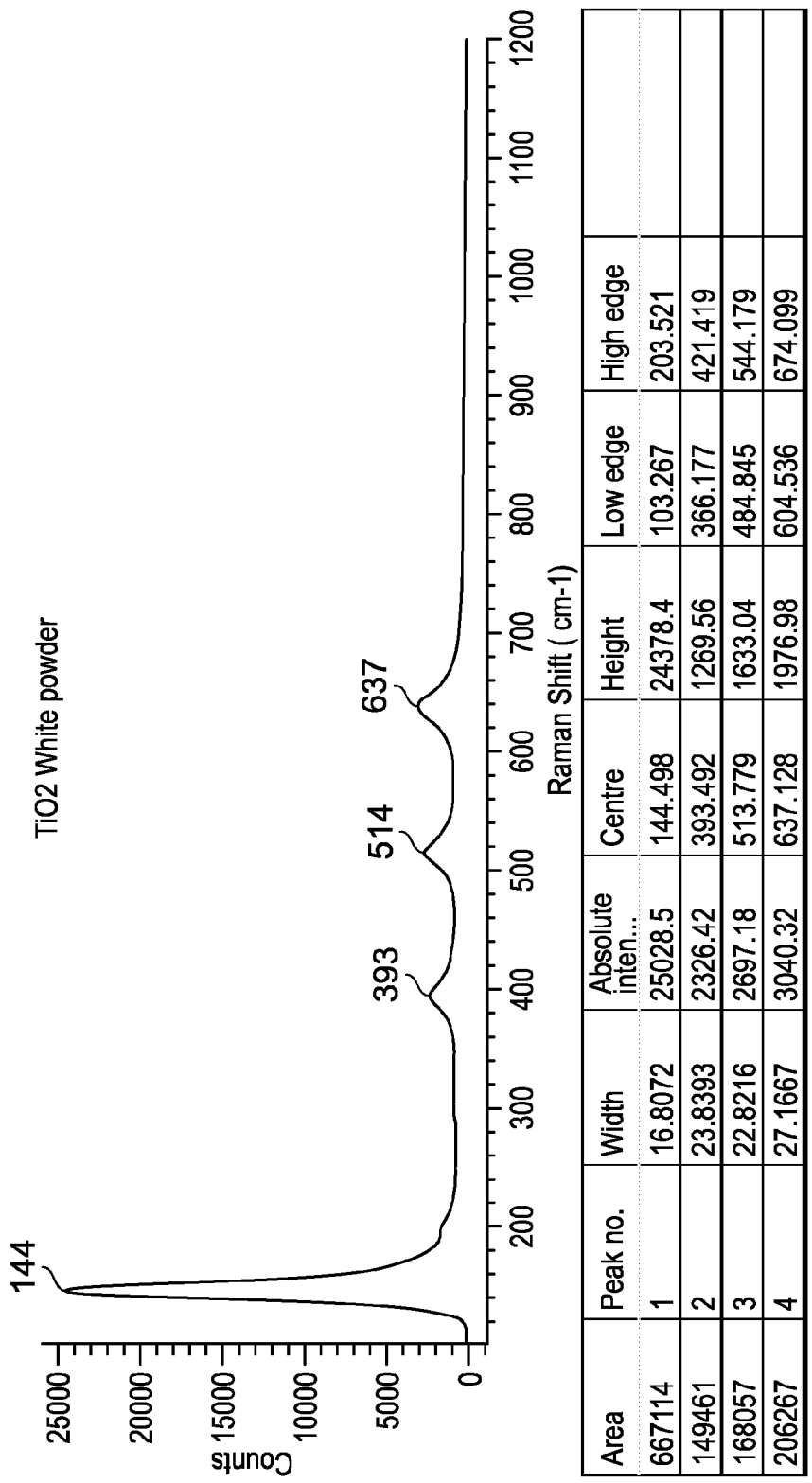
FIG. 4(a) is a Raman spectrum of titanium dioxide powder (anatase form)
Figure 4B:
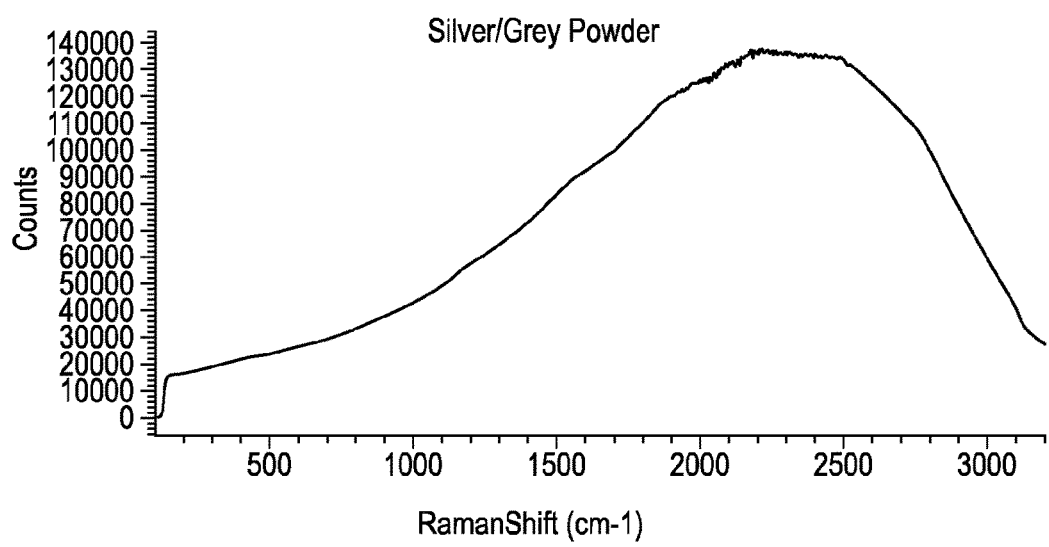
FIG. 4(b) is a Raman spectrum of titanium metal produced after reduction and leaching according to the method of the invention.

The results obtained from Raman spectroscopy are shown in FIGS. 4(a) and 4(b). In order for a molecule to be Raman active, i.e. polarised, it should exhibit either vibrations or rotations. Titanium dioxide is Raman active as it can exhibit vibrations or rotations due to the O—Ti—O or Ti—O bonds. These features are identified by the peaks shown in FIG. 4(a), and the spectral data confirms that the titanium dioxide used was anatase. The metal obtained after reduction and leaching was subjected to Raman spectral analysis and the results are shown in FIG. 4(b). No well-defined Raman spectrum was obtained from this sample, thereby indicating that the material is in the form of pure metal and confirming the earlier findings. Theoretically, metals cannot be polarised since the incident light falling on the metal gets reflected and, as a result, there are no vibrations or rotations occurring in the crystal lattice.

Thus, the method of the present invention provides a direct solid state reduction process which yields high purity solid metal by complete removal of the oxide layer from the metal oxide. The time taken for completion of the process is much lower than for prior art methods and the process is also more sustainable and environmentally friendly than known processes.

In the light of the successful isolation of ultra-high purity titanium sponge (3.6 g) from titanium dioxide (anatase) powder by the method previously described, the process was subsequently conducted on a larger scale. About 50 g of anatase ($TiO_2$, obtained from VWR International) was mixed with calcium metal in stoichiometric proportions in a cylindrical metal crucible in the presence of a solvent, such as acetone. The sample was dried and then transferred to a vacuum furnace. After 5 hours of reduction, the furnace was cooled and the sample was transferred to a beaker and leached out with 0.05M hydrochloric acid (HCl) to remove the calcium oxide produced during reduction; in order to complete this removal, repeated leaching was carried out by employing new leaching solution. The sample obtained after reduction and leaching was dried in an oven prior to analysis.

The anatase ($TiO_2$) used for this process was the same sample as previously described, obtained from VWR International, and had the same specification as detailed above. After reduction, the composition of the reduced anatase was found to be as shown in Table 5.

TABLE 5

Chemical Composition of Reduced Titanium Dioxide

| Constituents | % Composition |
| --- | --- |
| Oxygen | 15.63 |
| Calcium | 2.61 |
| Sodium | 0.43 |
| Titanium | 81.32 |

The reduced material having the above composition was leached several times in 0.05M HCl to remove the calcium oxide from the sample. After leaching the material was filtered and finally washed with acetone and dried in an oven. The dried sample was analysed for titanium content and the results are shown in Table 6.

TABLE 6

Chemical Composition of the Reduced and Leached Titanium Dioxide

| Constituents | % Composition |
| --- | --- |
| Titanium | 98.72 |
| Iron | 0.83 |
| Calcium | 0.45 |

Analytical tests were conducted on samples of the titanium dioxide, after reduction and before and after leaching, the techniques involved being scanning electron microscopy (SEM) and energy-dispersive X-ray spectroscopy (EDX). The results of these studies are illustrated in the accompanying figures.

Figure 5:
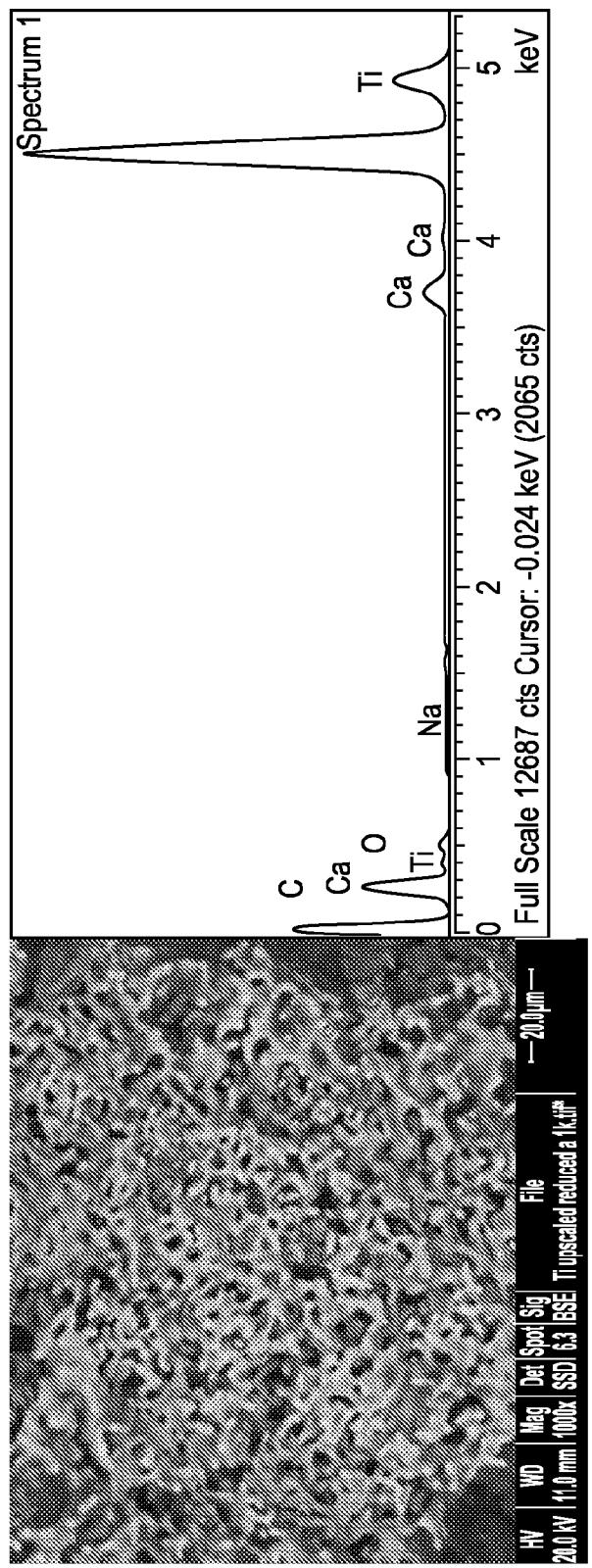
FIG. 5 is an SEM micrograph and corresponding EDX spectrum of reduced $TiO_2$ obtained after 5 hours of reduction according to the scaled-up method of the invention.
Figure 6:
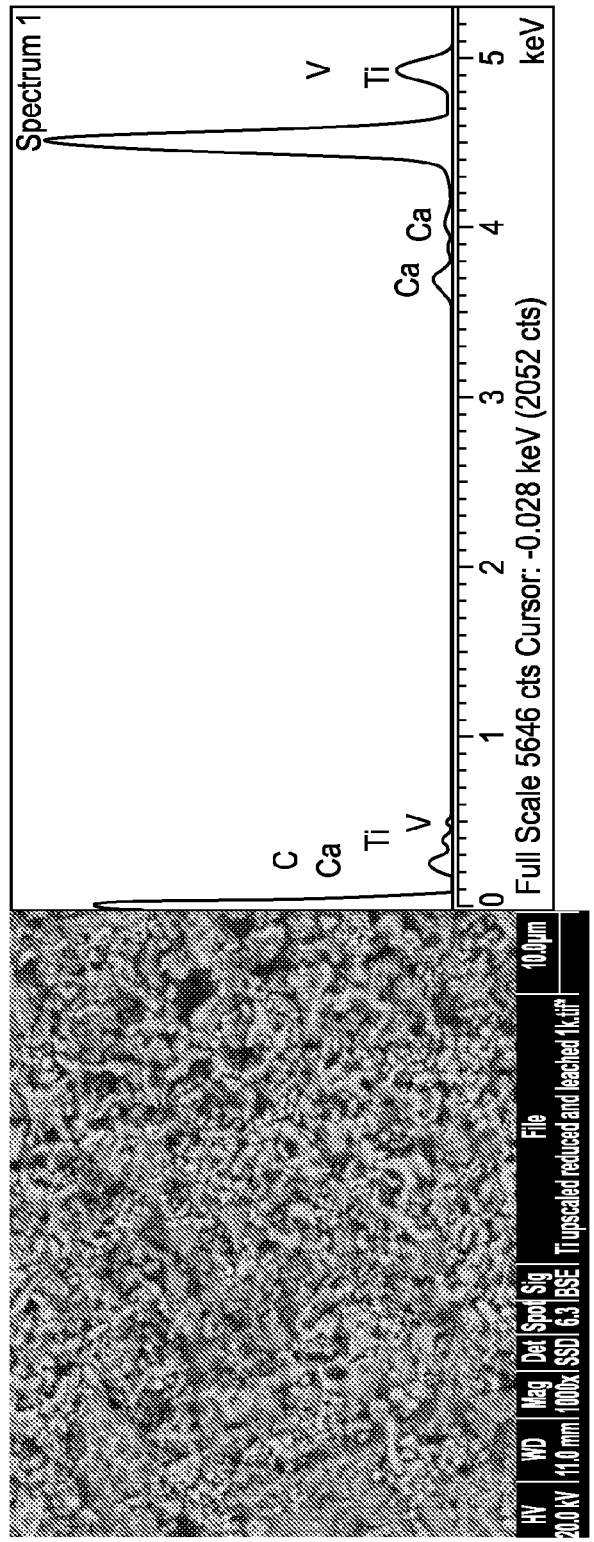
FIG. 6 is an SEM micrograph and corresponding EDX spectrum of titanium sponge obtained after leaching reduced $TiO_2$ obtained from the scaled-up method of the invention.

Thus, FIG. 5 shows the results of the SEM and EDX studies carried out on the titanium dioxide sample after reduction according to the method of the invention, whilst the corresponding results of the studies carried out on the reduced titanium dioxide sample after leaching according to the method of the invention are shown in FIG. 6.

Thus, it is again evident that ultra-high purity titanium sponge can be produced from anatase ($TiO_2$) and, in this scaled-up method, the 50 g of $TiO_2$ used for reduction produced around 35 g of titanium sponge.

The present method is particularly advantageous when applied to the production of titanium metal from titanium dioxide and offers particularly attractive commercial opportunities in this regard. Titanium is widely used in aviation, automotive and medical applications as well as other niche sectors such as heat exchangers, defence applications, medical implants, sports equipment and off-shore oil drilling. Aircraft such as the Airbus A380 and the Boeing 787, for example, have a Ti content of 9% (75 tonnes) and 14% (150 tonnes), respectively. In the automotive industry, the use of titanium has resulted in a decrease in fuel consumption of about 10% and this, in turn, reduces waste emissions.

In 2009, the total amount of titanium used globally in the automotive industry was about 3000 tons; this quantity is expected to increase year by year. In the nuclear industry, the use of titanium is increasing (500-600 tonnes) year upon year, whilst sea water desalination plants are constructed primarily from titanium. In hot coastal regions, such as in the Middle East, there is a growing demand for these plants. For a daily output for 240,000-270,000 cubic meters of water, the plant would require about 70 metric tons of titanium.

Thus, it is evident that the potential market for titanium is huge and constantly growing, and the availability of "cheaper" titanium metal will help to meet the growing challenges in manufacturing.

Tantalum is used in high temperature applications, especially in air-craft engines, electrical devices such as capacitors, surgical implants and handling corrosive chemicals. It resists corrosion and is impervious to chemical attack. It is also used in capacitors and tubes in electronic circuit.

Tantalum metal may be prepared according to the method of the invention by the reduction of tantalum pentoxide ($Ta_2O_5$). In a typical procedure, about 5 g of tantalum pentoxide ($Ta_2O_5$) was mixed with calcium in a stoichiometric ratio in a boat. The mixture was mixed with a solvent and then dried. The dried sample was transferred to a reduction furnace and a vacuum was applied. After 5 hours of reduction, the furnace was cooled and the sample was leached out with 0.05M hydrochloric acid (HCl) for 2 hours to remove the calcium oxide produced during reduction. The reduced and leached material was filtered and dried in an oven before analysis.

It was found that the $Ta_2O_5$ used for the reduction initially comprised 82% tantalum and 17.36% oxygen. After reduction the constitution was found to be as shown in Table 7.

TABLE 7

Chemical Composition of Reduced Tantalum Pentoxide

| Constituents | % Composition |
| --- | --- |
| Oxygen | 22 |
| Sodium | 0.298 |
| Sulphur | 0.27 |
| Calcium | 30.96 |
| Yttrium | 2.32 |
| Tantalum | 40.83 |
| Tungsten | 3.52 |

The reduced material having the above composition was leached in 0.05M HCl for 2 hours. After leaching the material was filtered and finally washed with acetone and dried in an oven. The dried sample was analysed for tantalum content and the results are shown in Table 8.

TABLE 8

Chemical Composition of the Reduced and Leached Tantalum Pentoxide

| Constituents | % Composition |
| --- | --- |
| Tantalum | 95.6 |
| Oxygen | 4.1 |

Analytical tests were conducted on samples of the tantalum pentoxide, before and after reduction and leaching, the techniques involved being scanning electron microscopy (SEM) and energy-dispersive X-ray spectroscopy (EDX). The results of these studies will now be discussed with reference to the accompanying figures.

Figure 7A:
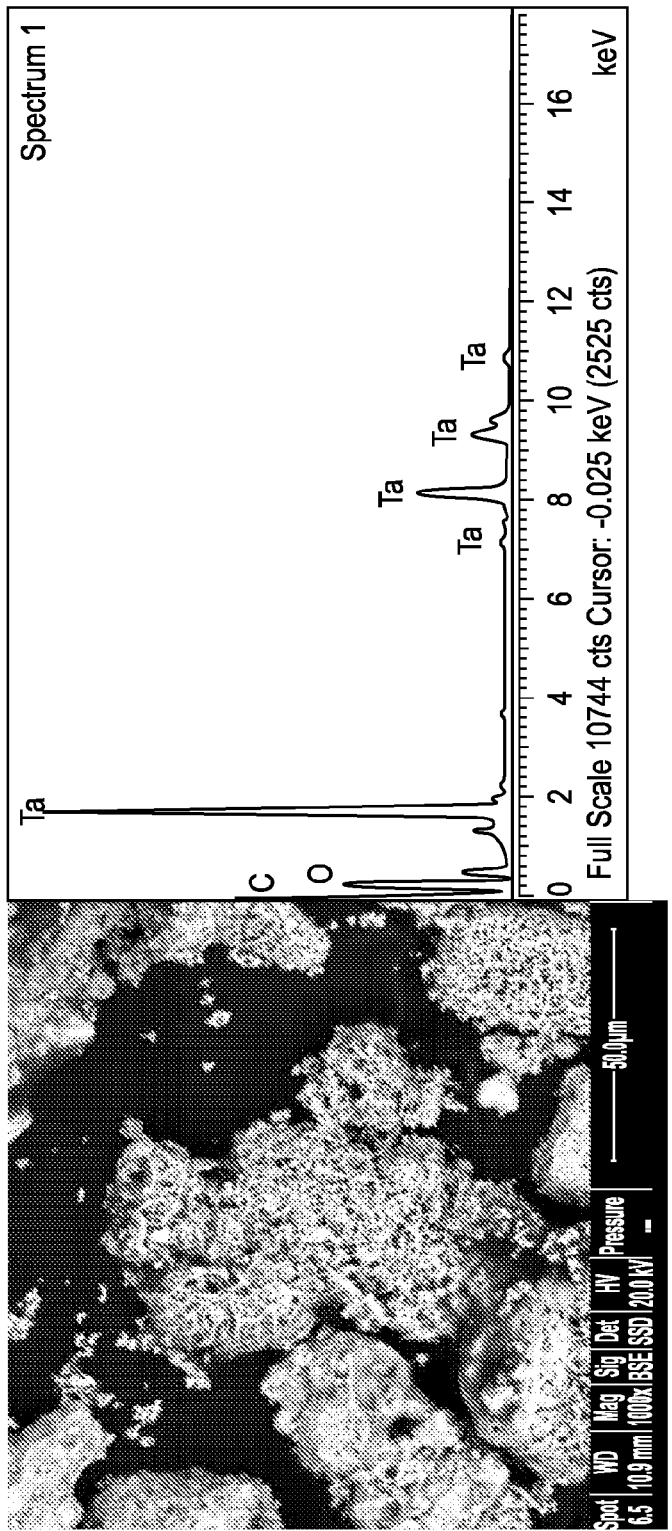
FIG. 7(a) is an SEM micrograph and corresponding EDX spectrum of $Ta_2O_5$ powder used for reduction according to the method of the invention.
Figure 7B:
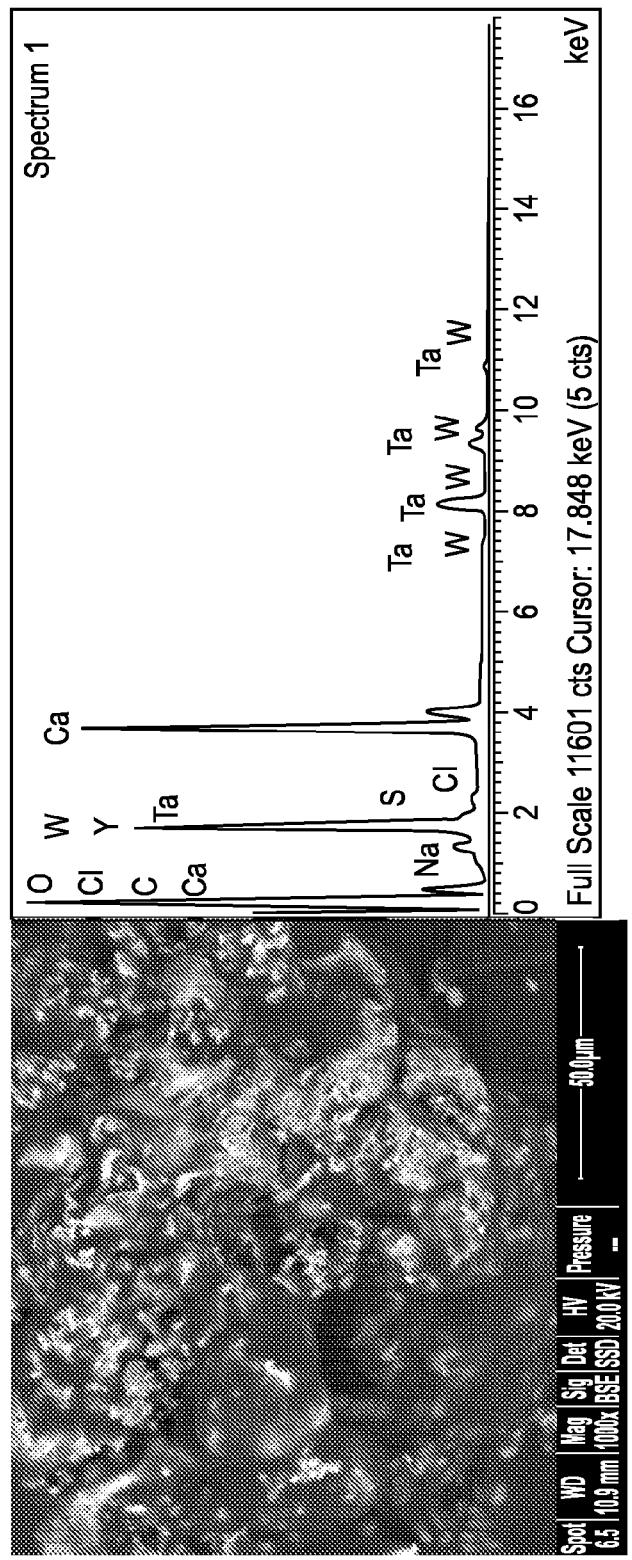
FIG. 7(b) is an SEM micrograph and corresponding EDX spectrum of reduced $Ta_2O_5$ obtained after 5 hours of reduction according to the method of the invention.

Thus, FIGS. 7(a) and 7(b) show the results of the SEM and EDX studies carried out on the tantalum pentoxide sample before and after reduction according to the method of the invention. In the micrograph of the reduced sample the brighter areas are attributed to the reduced tantalum, whilst the grey-looking part is the calcium oxide phase; here it also appears that calcium oxide forms a host matrix for the reduced tantalum.

Figure 8:
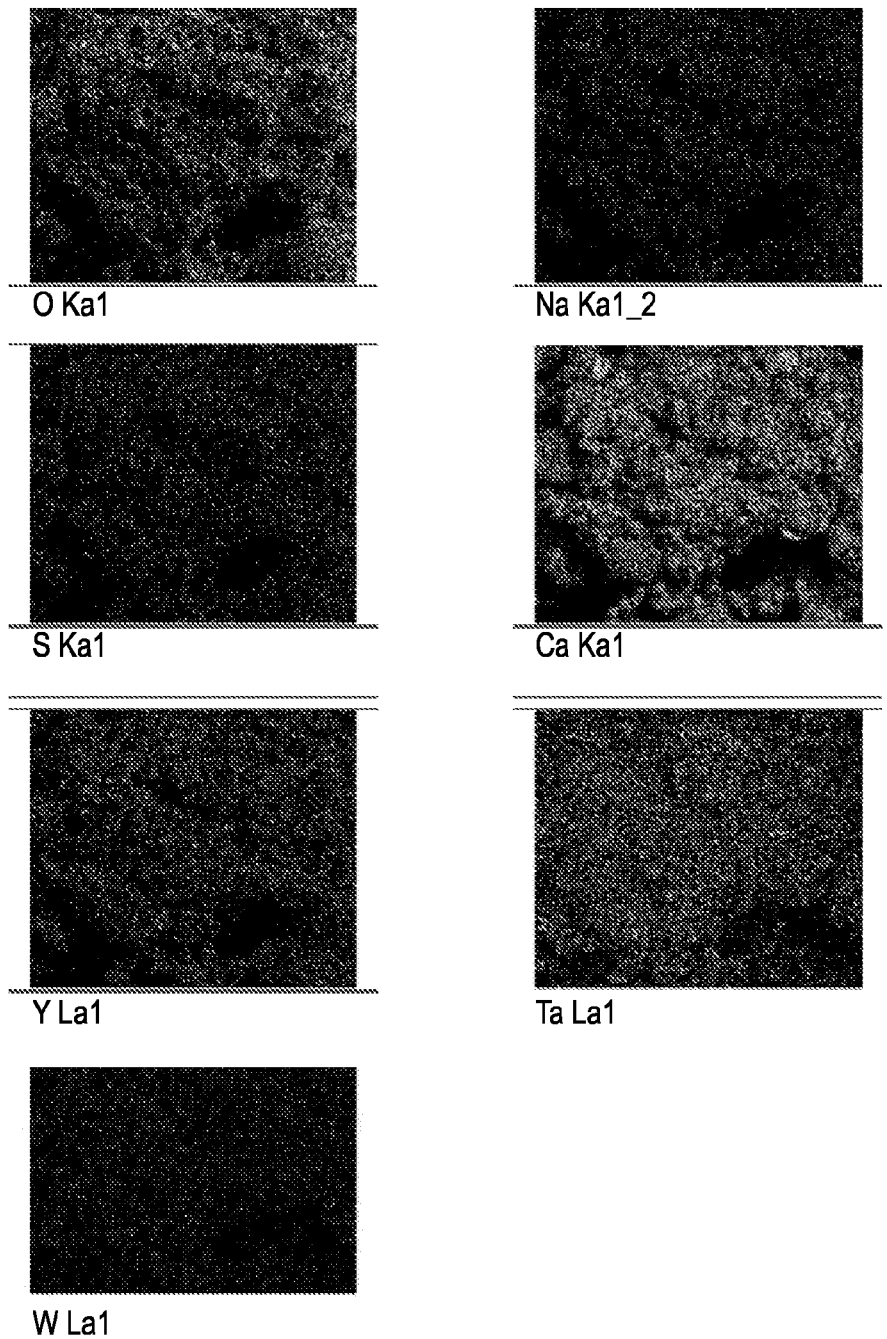
FIG. 8 is an elemental EDX map of the reduced $Ta_2O_5$ sample.

FIG. 8 is the elemental EDX map of the reduced pentoxide sample, which shows the distribution of each element shown in the micrographed sample.

Figure 9:
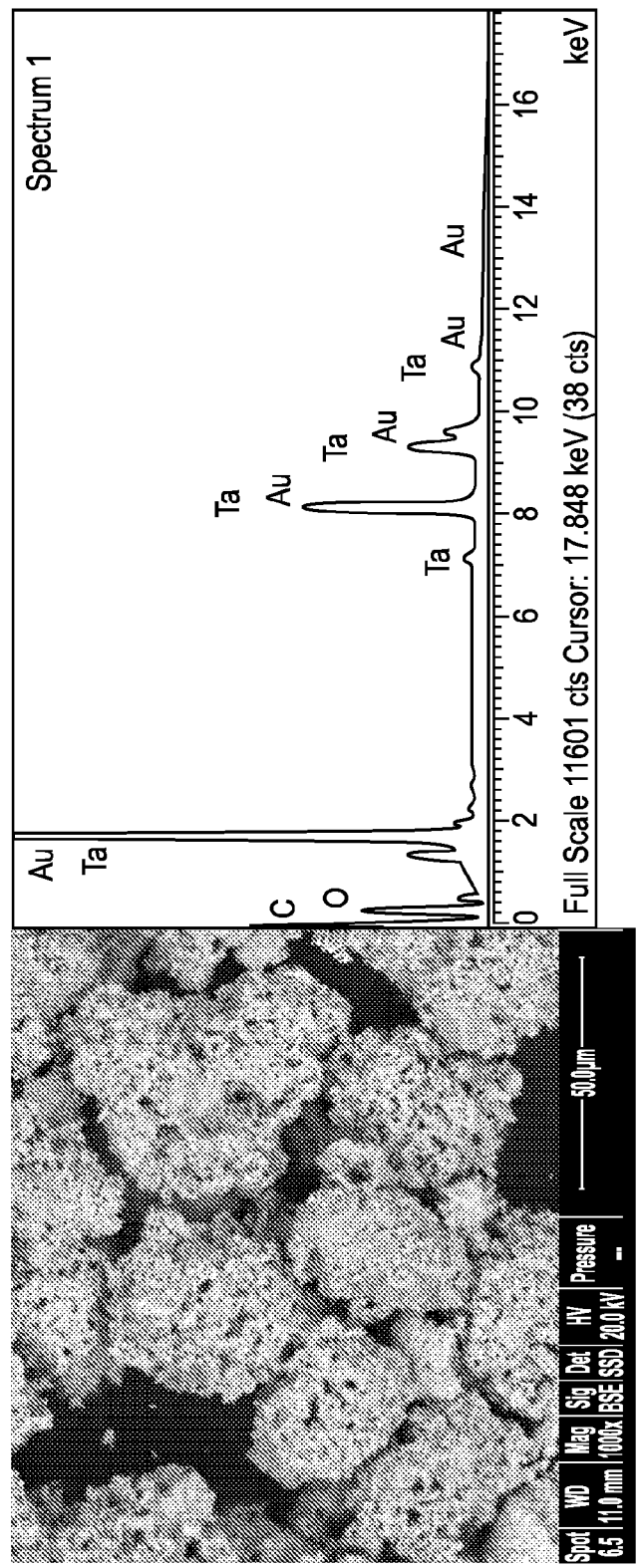
FIG. 9 is an SEM micrograph and corresponding EDX spectrum of the tantalum metal sponge obtained after leaching reduced $Ta_2O_5$.

The results of the SEM and EDX studies carried out on the reduced tantalum pentoxide sample after leaching according to the method of the invention are shown in FIG. 9 and it is evident from the SEM micrograph that, during leaching, most of the impurities are removed, leaving behind highly pure tantalum. The particle size of the sponge is seen to have grown considerably. The corresponding EDX spectrum shows the presence of adsorbed oxygen in the system which, on analysis, was found to be less than 5%.

Figure 10:
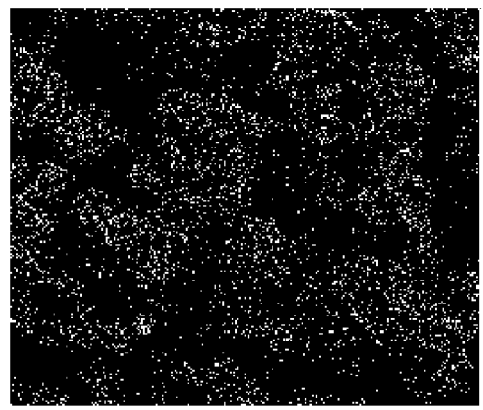
FIG. 10 is an elemental EDX map of the tantalum metal sponge.
Figure 10:

The elemental EDX map of the tantalum sponge is shown in FIG. 10, and this shows the presence of adsorbed oxygen dispersed throughout the sample.

Thus, as in the case of titanium production from titanium dioxide, it is evident that tantalum pentoxide can be efficiently reduced to tantalum metal in the presence of calcium, according to the method of the invention.

Niobium is used for the production of high temperature resistant alloys and special stainless steel. Small amounts of niobium impart greater strength to other metals, especially those that are exposed to low temperatures. Consequently, it is used in applications such as nuclear reactors, jets, missiles, cutting tools, pipelines, super magnets and welding rods. Niobium-tin and Niobium-titanium alloys are used as wires for superconducting magnets capable of producing exceedingly strong magnetic fields, whilst niobium in its pure form is used to make superconducting accelerating structures for particle accelerators. Niobium alloys are used in surgical implants because they do not react with human tissue.

Niobium metal may also be prepared according to the method of the invention by the reduction of niobium pentoxide ($Nb_2O_5$). In a typical procedure about 5 g of niobium pentoxide ($Nb_2O_5$) was mixed with calcium in a stoichiometric ratio in a boat. The mixture was mixed with a solvent and then dried. The dried sample was transferred to a reduction furnace and a vacuum was applied. After 5 hours of reduction, the furnace was cooled and the sample was leached out with 0.05M hydrochloric acid (HCl) for 2 hours to remove the calcium oxide produced during reduction. The reduced and leached material was filtered and dried in an oven before analysis.

It was found that the $Nb_2O_5$ used for the reduction initially comprised 60% niobium, 38.5% oxygen and 1.7% sodium. After reduction the constitution was found to be as shown in Table 9.

TABLE 9

Chemical Composition of Reduced Niobium Pentoxide

| Constituents | % Composition |
| --- | --- |
| Oxygen | 22.68 |
| Calcium | 39.75 |
| Niobium | 37.5 |

The reduced material having the above composition was leached in 0.05M HCl for 2 hours. After leaching the material was filtered and finally washed with acetone and dried in an oven. The dried sample was analysed for niobium content and the results are shown in Table 10.

TABLE 10

Chemical Composition of the Reduced and Leached Niobium Pentoxide

| Constituents | % Composition |
| --- | --- |
| Niobium | 94.07 |
| Oxygen | 5.56 |
| Calcium | 0.37 |

Analytical tests were conducted on samples of the niobium pentoxide, before and after reduction and leaching, the techniques involved being scanning electron microscopy (SEM) and energy-dispersive X-ray spectroscopy (EDX). The results of these studies will now be discussed with reference to the accompanying figures.

Figure 11A:
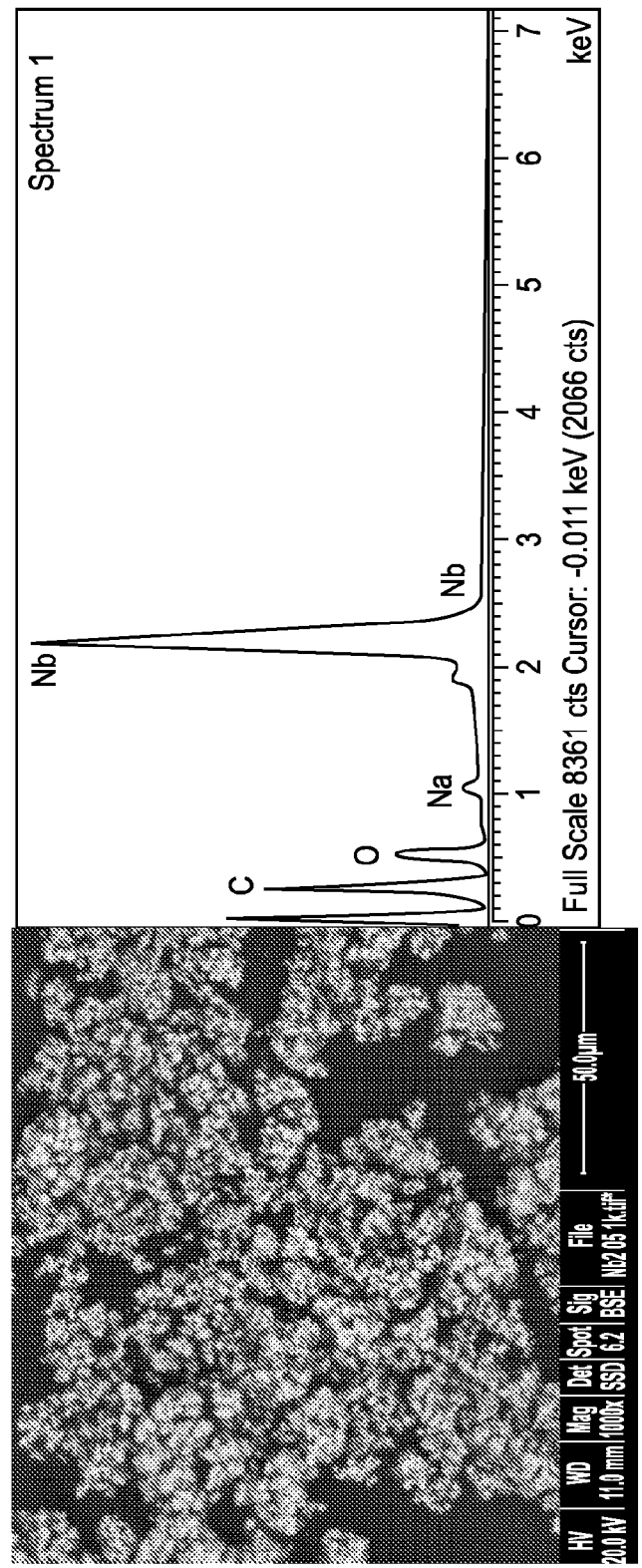
FIG. 11(a) is an SEM micrograph and corresponding EDX spectrum of $Nb_2O_5$ powder used for reduction according to the method of the invention.
Figure 11B:
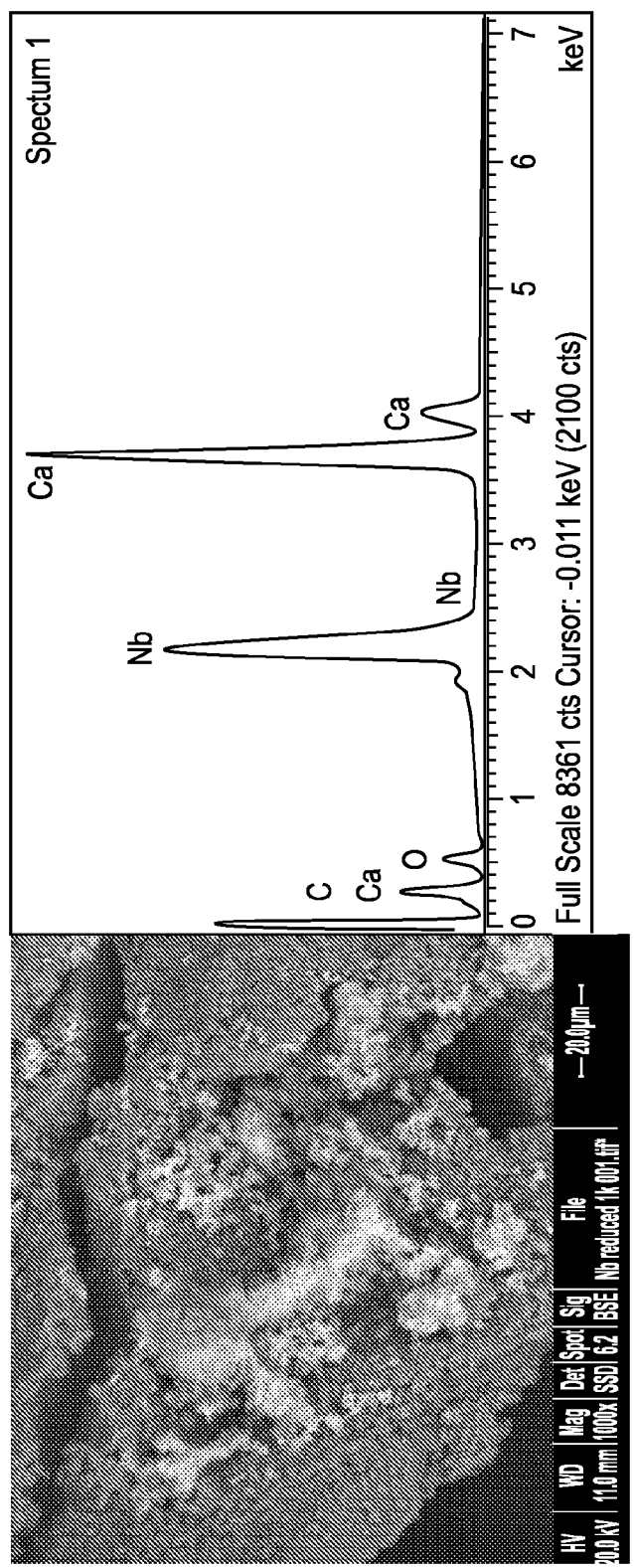
FIG. 11(b) is an SEM micrograph and corresponding EDX spectrum of reduced $Nb_2O_5$ obtained after 5 hours of reduction according to the method of the invention.

Thus, FIGS. 11(a) and 11(b) show the results of the SEM and EDX studies carried out on the niobium pentoxide sample before and after reduction according to the method of the invention. In the micrograph of the reduced sample the brighter areas are attributed to the reduced niobium, whilst the grey-looking part is the calcium oxide phase; here it also appears that calcium oxide forms a host matrix for the reduced niobium.

Figure 12:
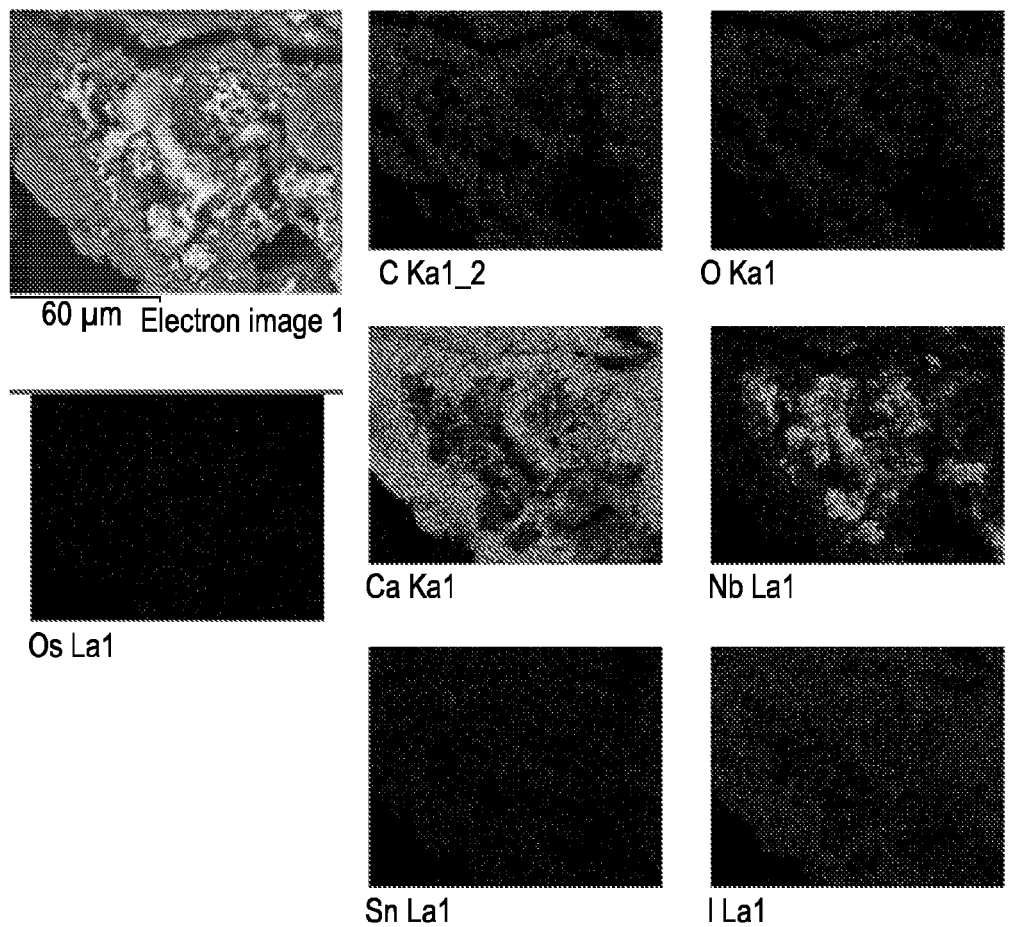
FIG. 12 is an elemental EDX map of the reduced $Nb_2O_5$ sample.

FIG. 12 is the elemental EDX map of the reduced pentoxide sample, which shows the distribution of each element shown in the micrographed sample.

Figure 13:
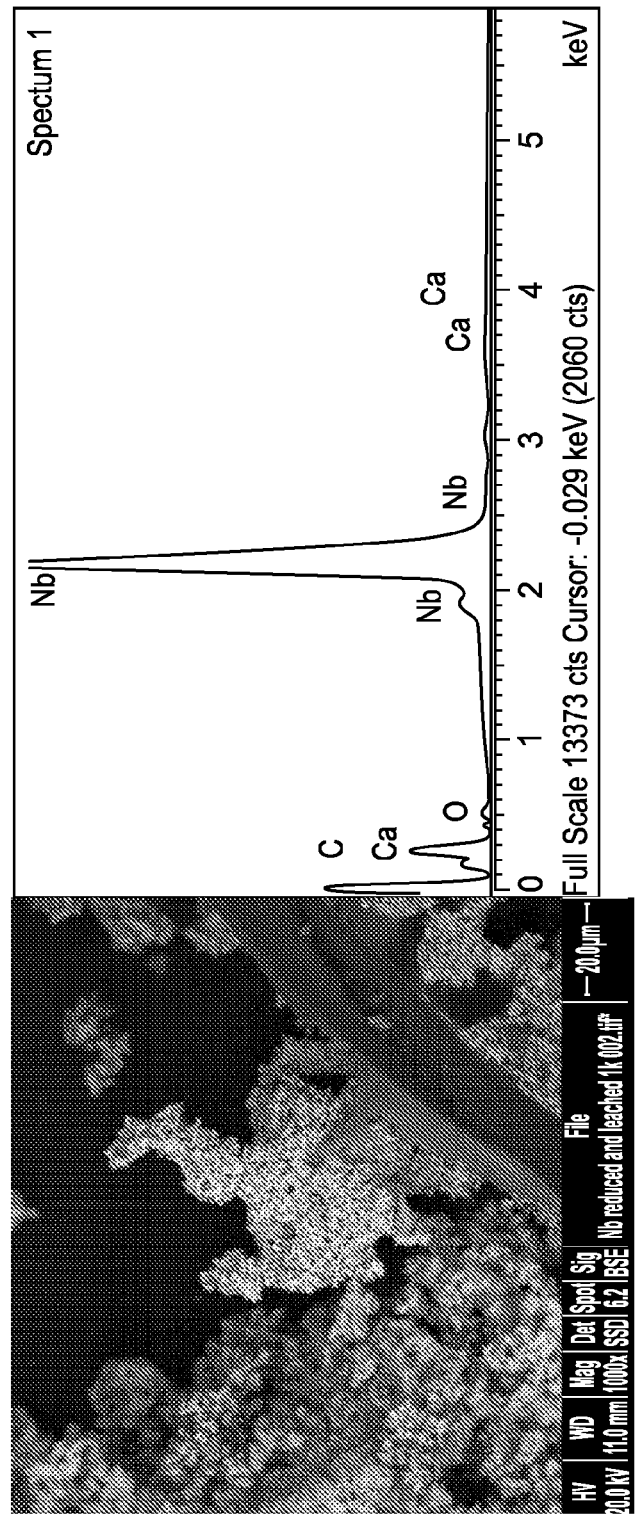
FIG. 13 is an SEM micrograph and corresponding EDX spectrum of the niobium metal sponge obtained after leaching reduced $Nb_2O_5$.

The results of the SEM and EDX studies carried out on the reduced niobium pentoxide sample after leaching according to the method of the invention are shown in FIG. 13 and it is evident from the SEM micrograph that, during leaching, most of the impurities are removed, leaving behind highly pure niobium. The particle size of the sponge is seen to have grown considerably. The corresponding EDX spectrum shows the presence of both calcium and oxygen in the system, which provides evidence that the reaction is not yet complete. On analysis, the content of oxygen was found to be around 5% and the content of calcium was 0.2%.

Figure 14:
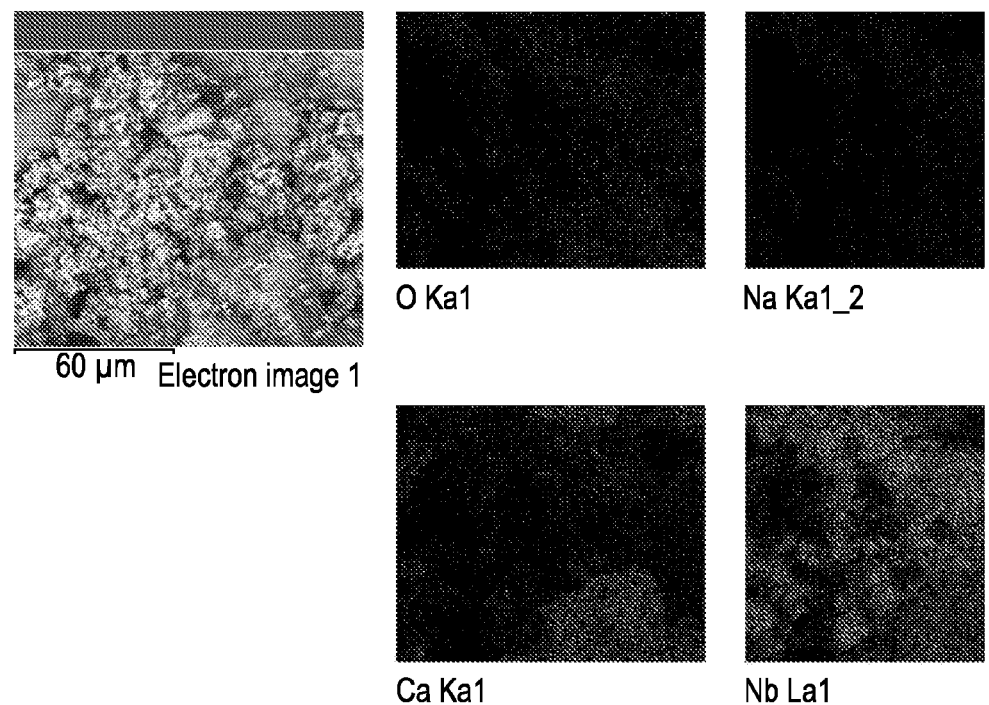
FIG. 14 is an elemental EDX map of the niobium metal sponge.

The elemental EDX map of the niobium sponge is shown in FIG. 14, and this shows the presence of oxygen and calcium dispersed throughout the sample.

Thus, as in the case of titanium production from titanium dioxide and tantalum production from tantalum pentoxide, it is evident that niobium pentoxide can be efficiently reduced to niobium metal in the presence of calcium, according to the method of the invention. However, it is necessary to optimise the reduction temperature and time in order to produce ultra-high pure metal from the oxide.

Hafnium is a ductile metal. Its properties are influenced by its impurities of zirconium, and hafnium and zirconium are very difficult to separate. Hafnium has a good absorption cross-section for thermal neutrons (almost 600 times that of zirconium) and it also has excellent mechanical properties and is extremely corrosion resistant. It is used in nuclear reactors as control rods.

Hafnium metal may also be prepared according to the method of the invention by the reduction of hafnium dioxide ($HfO_2$). In a typical procedure about 5 g of hafnium dioxide ($HfO_2$) was mixed with calcium in a stoichiometric ratio in a boat. The mixture was mixed with a solvent and then dried. The dried sample was transferred to a reduction furnace and a vacuum was applied. After 5 hours of reduction, the furnace was cooled and the sample was leached out with 0.05M hydrochloric acid (HCl) for 2 hours to remove the calcium oxide produced during reduction. The reduced and leached material was filtered and dried in an oven before analysis.

It was found that the $HfO_2$ used for the reduction initially comprised 66.28% hafnium, 31.18% oxygen and 0.73% sodium. After reduction the constitution was found to be as shown in Table 11.

TABLE 11

Chemical Composition of Reduced Hafnium Dioxide

| Constituents | % Composition |
|---|---|
| Oxygen | 15.48 |
| Calcium | 10.78 |
| Rubidium | 2.07 |
| Hafnium | 68.25 |
| Rhenium | 2.14 |
| Osmium | 1.25 |

The reduced material having the above composition was leached in 0.05M HCl for 2 hours. After leaching the material was filtered and finally washed with acetone and dried in an oven. The dried sample was analysed for hafnium content and the results are shown in Table 12.

TABLE 12

Chemical Composition of the Reduced and Leached Hafnium Dioxide

| Constituents | % Composition |
|---|---|
| Hafnium | 80.17 |
| Oxygen | 10.58 |
| Calcium | 8.1 |
| Osmium | 1.12 |

Analytical tests were conducted on samples of the hafnium dioxide, before and after reduction and leaching, the techniques involved being scanning electron microscopy (SEM) and energy-dispersive X-ray spectroscopy (EDX). The results of these studies will now be discussed with reference to the accompanying figures.

Figure 15A:
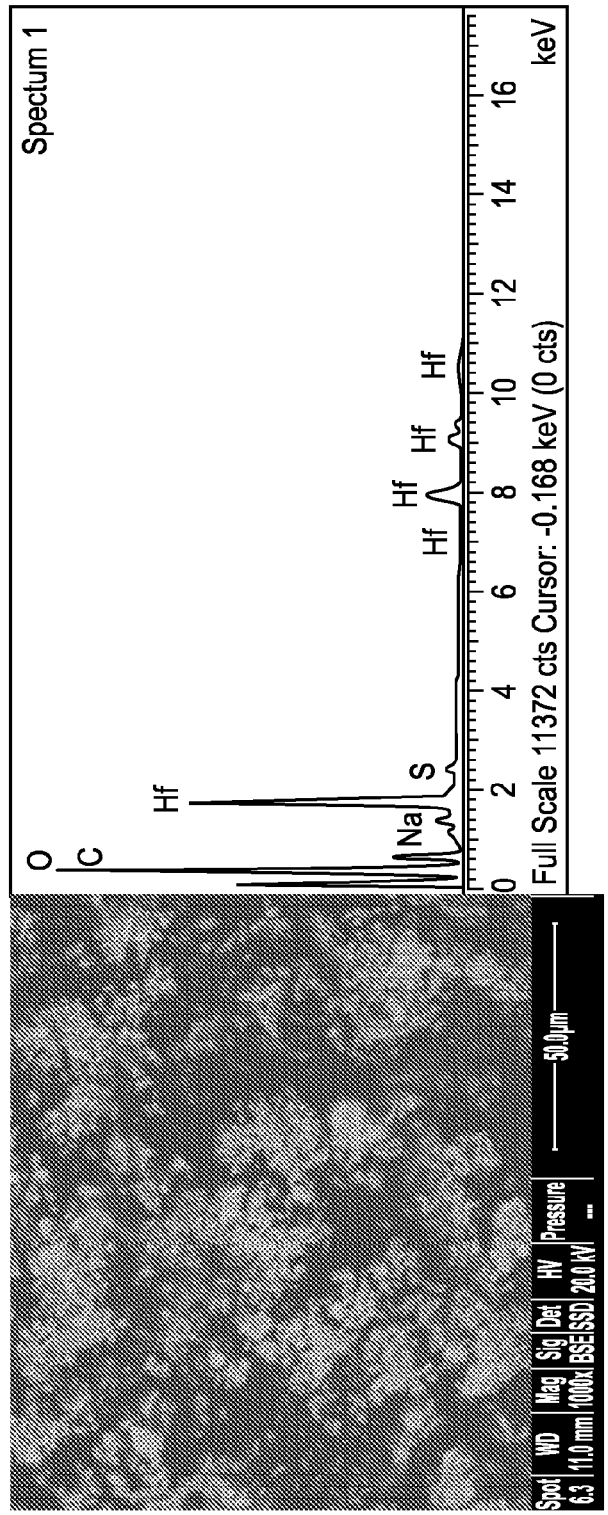
FIG. 15(a) is an SEM micrograph and corresponding EDX spectrum of $HfO_2$ powder used for reduction according to the method of the invention.
Figure 15B:
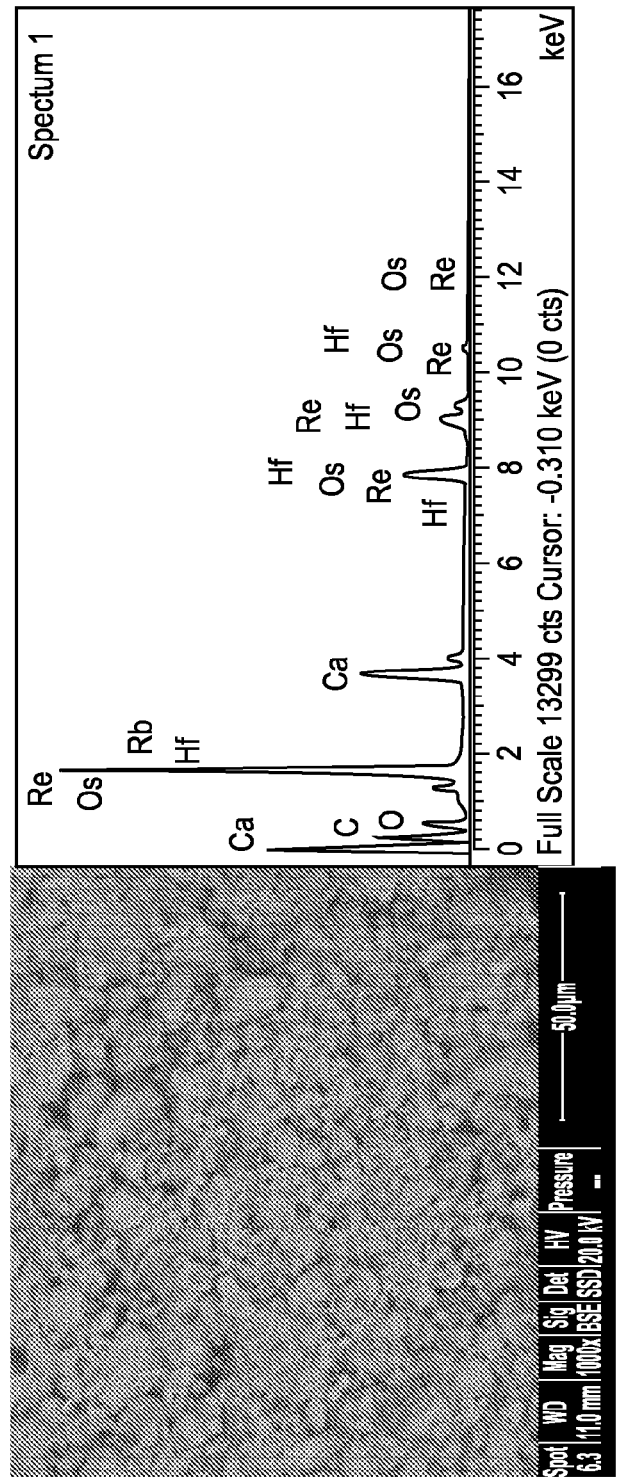
FIG. 15(b) is an SEM micrograph and corresponding EDX spectrum of reduced $HfO_2$ obtained after 5 hours of reduction according to the method of the invention.

Thus, FIGS. 15(a) and 15(b) show the results of the SEM and EDX studies carried out on the hafnium dioxide sample before and after reduction according to the method of the invention. In the micrograph of the reduced sample, no distinct separation was identified between the reduced hafnium phase and the calcium phase. It appears as though the reduction reaction may not have been completed as the EDX clearly shows the presence of both calcium and oxygen. The micrograph illustrates a uniform dispersion with no bright or grey areas.

Figure 16:
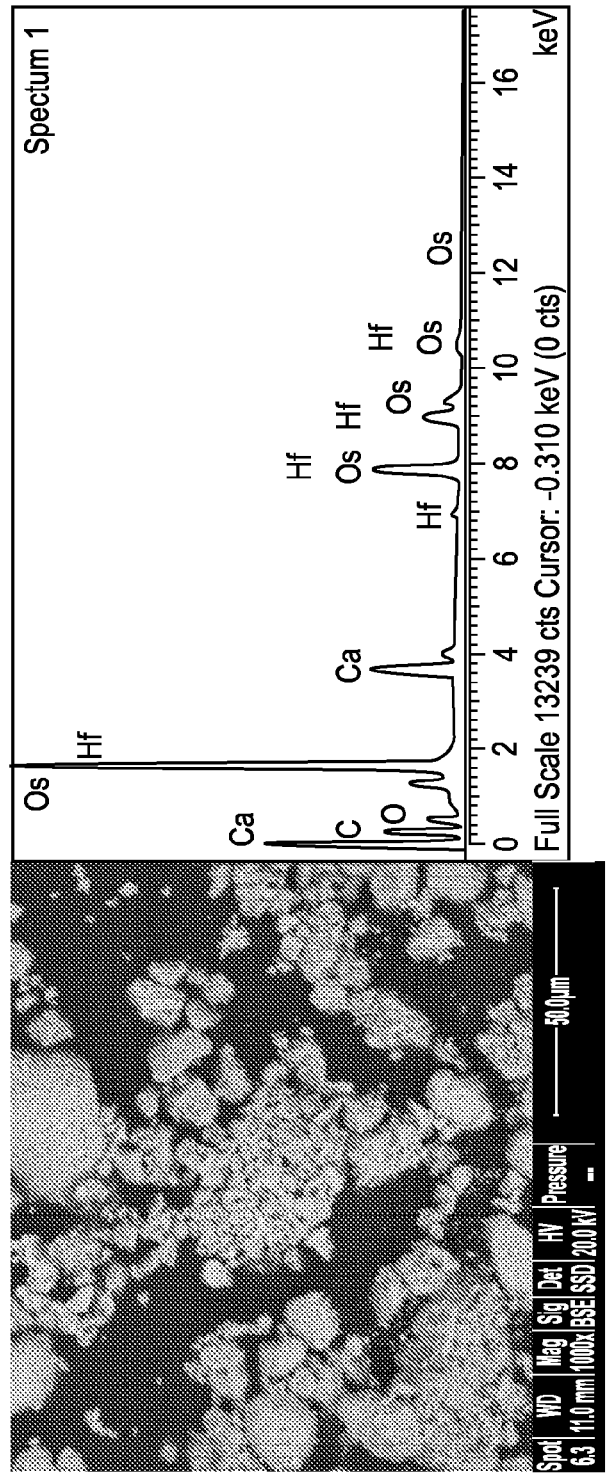
FIG. 16 is an SEM micrograph and corresponding EDX spectrum of hafnium sponge obtained after leaching reduced $HfO_2$.

The results of the SEM and EDX studies carried out on the reduced hafnium dioxide sample after leaching according to the method of the invention are shown in FIG. 16 and it is evident from the results that hafnium dioxide requires one or both of a longer time or higher temperature in order to achieve complete reduction.

It appears, therefore, that hafnium production from hafnium dioxide may be successfully achieved following further optimisation studies directed to the production and isolation of ultra-high purity metal.

Zirconium is a greyish-white lustrous metal which is used in alloys such as zircalloy, which finds particular application in the nuclear field, as it does not readily absorb neutrons. It is also used in catalytic converters and furnace bricks.

Zirconium metal may also be prepared according to the method of the invention by the reduction of zirconium dioxide ($ZrO_2$). In a typical procedure about 5 g of zirconium dioxide ($ZrO_2$) was mixed with calcium in a stoichiometric ratio in a boat. The mixture was mixed with a solvent to form a slurry and then dried in an oven. The dried sample was transferred to a reduction furnace and a vacuum was applied. After 5 hours of reduction, the furnace was cooled and the sample was leached out with 0.05M hydrochloric acid (HCl) for 2 hours to remove the calcium oxide produced during reduction. The reduced and leached material was filtered and dried in an oven before analysis.

It was found that the $ZrO_2$ used for the reduction initially comprised 71.27% zirconium, 25.42% oxygen, 0.49% sodium, 0.79% hafnium and 2.03% rhenium. After reduction the constitution was found to be as shown in Table 13.

TABLE 13

Chemical Composition of Reduced Zirconium Dioxide

| Constituents | % Composition |
|---|---|
| Oxygen | 29.74 |
| Calcium | 31.17 |
| Zirconium | 39.09 |

The reduced material having the above composition was leached in 0.05M HCl for 2 hours. After leaching the material was filtered and finally washed with acetone and dried in an oven. The dried sample was analysed for zirconium content and the results are shown in Table 14.

TABLE 14

Chemical Composition of the Reduced and Leached Zirconium Dioxide

| Constituents | % Composition |
|---|---|
| Zirconium | 71.74 |
| Oxygen | 15.94 |
| Calcium | 7.21 |
| Hafnium | 1.83 |
| Tungsten | 1.29 |
| Rhenium | 1.99 |

Analytical tests were conducted on samples of the zirconium dioxide, before and after reduction and leaching, the techniques involved being scanning electron microscopy (SEM) and energy-dispersive X-ray spectroscopy (EDX). The results of these studies will now be discussed with reference to the accompanying figures.

Figure 17A:
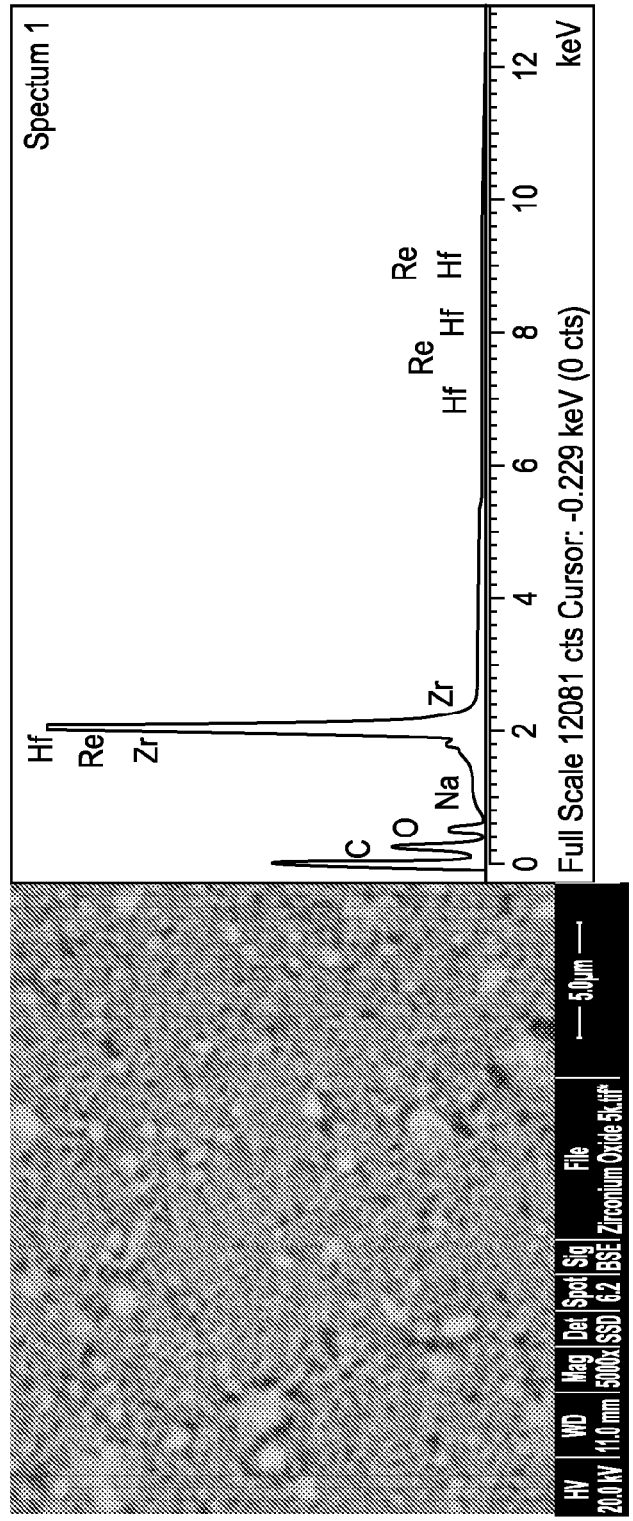
FIG. 17(a) is an SEM micrograph and corresponding EDX spectrum of $ZrO_2$ powder used for reduction according to the method of the invention.
Figure 17B:
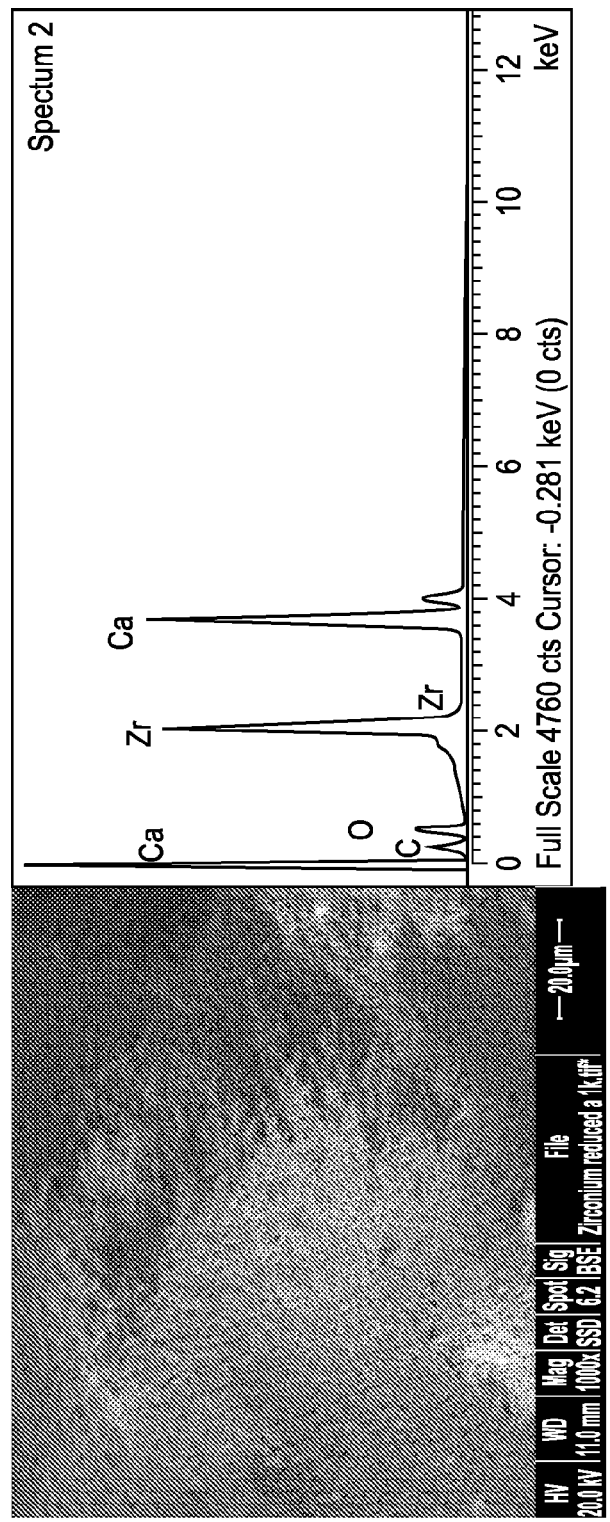
FIG. 17(b) is an SEM micrograph and corresponding EDX spectrum of reduced $ZrO_2$ obtained after 5 hours of reduction according to the method of the invention.

Thus, FIGS. 17(a) and 17(b) show the results of the SEM and EDX studies carried out on the zirconium dioxide sample before and after reduction according to the method of the invention. In the micrograph of the reduced sample, no distinct separation was identified between the reduced zirconium phase and the calcium phase. It appears that the reduction reaction may not be completed, as the EDX clearly shows the presence of calcium and oxygen. The micrograph presents a uniform dispersion with very small bright and considerably large grey areas.

Figure 18:
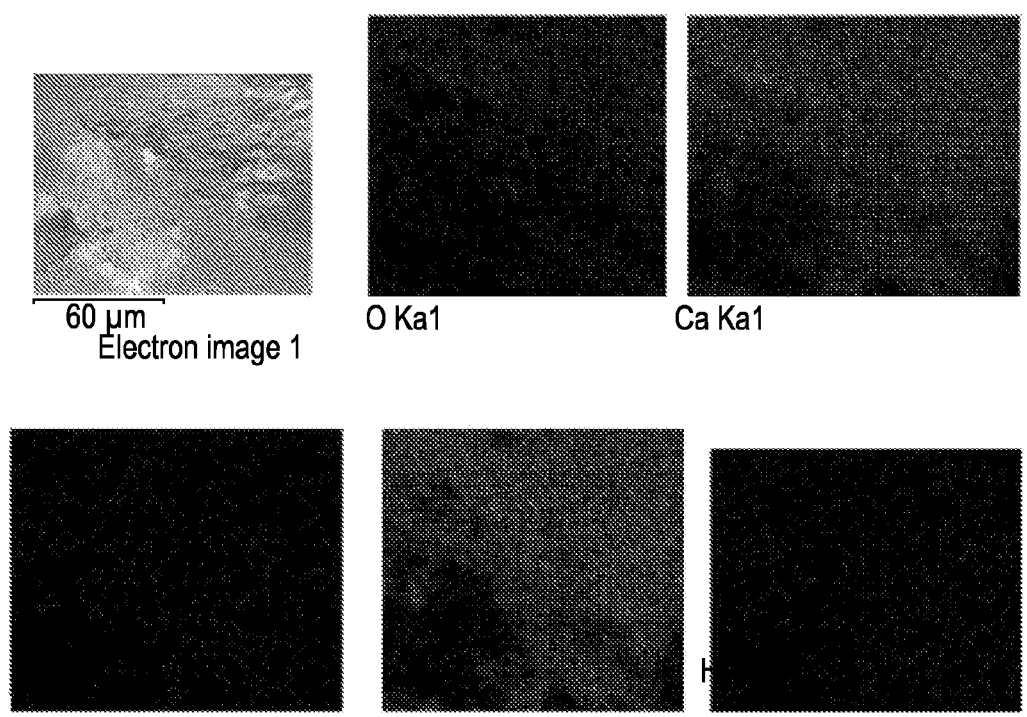
FIG. 18 is an elemental EDX map of the elements present in the reduced $ZrO_2$ sample.

FIG. 18 is the elemental EDX map of the reduced dioxide sample, which shows the distribution of each element shown in the micrographed sample.

Figure 19:
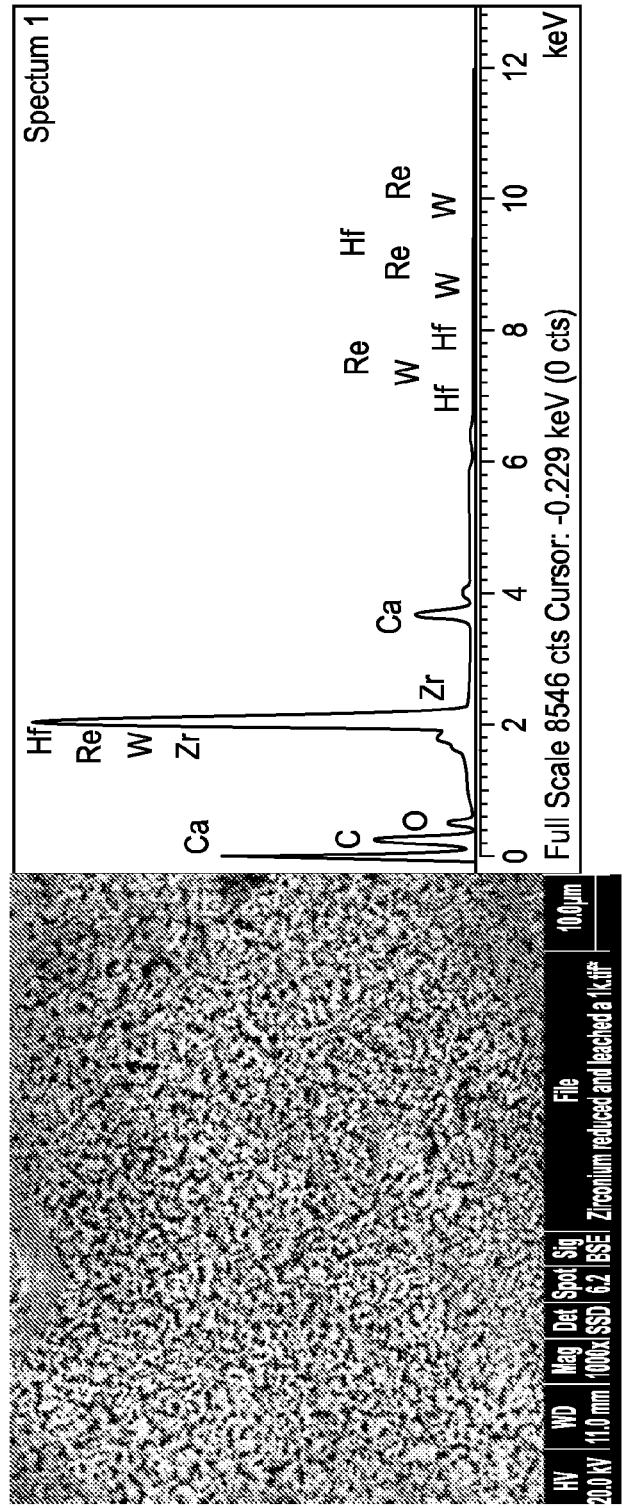
FIG. 19 is an SEM micrograph and corresponding EDX spectrum of the zirconium oxide sample obtained after leaching reduced $ZrO_2$.
Figure 20:
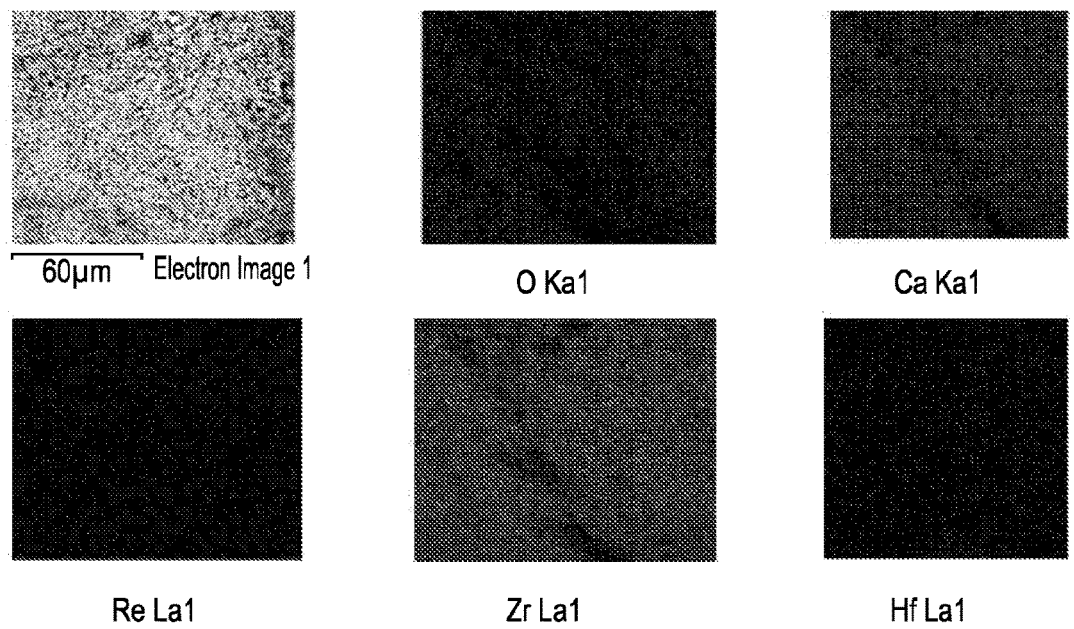
FIG. 20 is an elemental EDX map of the elements present in the reduced and leached zirconium oxide.

The results of the SEM and EDX studies carried out on the reduced zirconium dioxide sample after leaching according to the method of the invention are shown in FIG. 19 and the elemental EDX map of the reduced and leached zirconium oxide sample is presented in FIG. 20.

Thus, from the above analysis, it is apparent that the successful reduction of zirconium dioxide requires a longer time or a higher temperature in order to complete the process. However, it is clear from the data that this metal can be produced by reduction of the oxide, but further optimisation is required in order to be able to isolate ultra-high purity metal.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

1. Massalski, T. B., Okamoto, H., Subramanian, P. R. & Kacprzak, L. (eds), *Binary* Alloy Phase Diagrams 2nd edn, Vol. 3, 2924-2927 (ASM International, Materials Park, 1990).
2. Kroll, W. J., The production of ductile titanium, *Trans. Am. Electrochem. Soc.* 78, 35-47 (1940).
3. Ikeshima, T., in *Titanium Science and Technology, Proc. 5th Int. Conf. Titanium*, München 1984 (eds Lutjering, G., Zwicker, U. & Bunk, W.) 3-14 (DGM-Deutsche Gesellschaft für Materialkunde e.V., Oberursal, 1985).
4. Cobel, G., Fisher, J. & Synder, L. E., in *Titanium '80, Science and Technology, Proc. 4th Int. Conf. Titanium, Kyoto* 1980 (eds Kimura, H. & Izumi, O.) 1969-1976 (The Metallurgical Society of AIME, Warrendale, 1980).
5. Opie, W. R. & Moles, O. W., A basket cathode electrolytic cell for production of titanium, Trans. *Met. Soc. AIME* 218, 646-649 (1960).
6. Ginatta, M. V., Method of producing metals by cathodic dissolution of their compounds, U.S. Pat. No. 4,400,247 (23 Aug. 1983).
7. Froes, F. H., Titanium and other light metals: let's do something about cost, *JOM* 50, 15 (1998).
8. Hartman, A. D., Gerdemann, S. J. & Hansen, J. S., Producing lower-cost titanium for automotive applications, *JOM* 50, 16-19 (1998).
9. Suzuki, K., The high-quality precision casting of titanium alloys, *JOM* 50, 20-23 (1998).
10. Okabe, T., Ohkubo, C., Watanabe, I., Okuno, O. & Takada, Y, The present status of dental titanium casting, *JOM* 50, 24-29 (1998).
11. Froes, F. H., The production of low-cost titanium powders, *JOM* 50, 41-43 (1998).
12. Tapphorn, R. M. & Gabel, H., The solid-state spray forming of low-oxide titanium components, *JOM* 50, 45-46, 76 (1998).
13. Elliott, G. R. B., The continuous production of titanium powder using circulating molten salt, *JOM* 50, 48-49 (1998).
14. Sohn, H. Y., Ti and TiAl powders by the flash reduction of chloride vapors, *JOM* 50, 50-51 (1998).
15. Segall, A. E., Papyrin, A. N., Conway, J. C. Jr. & Shapiro, D., A cold-gas spray coating process for enhancing titanium, *JOM* 50, 52-54 (1998).
16. George Zheng Chen, Derek J, Fray and Tom W. Farthing, Direct electrochemical reduction of titanium dioxide to titanium in molten chloride, Nature, 407, 361-364, (2000).
17. Oosthuizen, In search of low cost titanium: the Fray Farthing Chen (FFC) Cambridge Process, (The Journal of South African Inst. of Min. and Met.), 111, 1-5, (2011).

The invention claimed is:

1. A method for production of metals, said method comprising the steps of:
   (a) mixing an oxide of a metal in a receptacle with a reducing agent comprising a Group II metal in the presence of an organic solvent selected from aldehydes, ketones, ethers, and esters;
   (b) heating the mixture of an oxide of the metal and a reducing agent;
   (c) leaching the material obtained from the heating step with water; and
   (d) washing the material obtained from the leaching step with a dilute aqueous acid;
   wherein said method comprises a solid state reduction process.

2. A method as claimed in claim 1 wherein said metal is a transition metal or a rare earth metal and said oxide of the metal is an oxide of the transition or rare earth metal.

3. A method as claimed in claim 2 wherein said transition metal is titanium, tantalum, niobium, hafnium or zirconium and said oxide of the transition metal is titanium dioxide, tantalum pentoxide, niobium pentoxide, hafnium dioxide or zirconium dioxide.

4. A method as claimed in claim 1 wherein the heating process is carried out in a chamber or furnace.

5. A method as claimed in claim 1 wherein the temperature of reaction is from 750° to 1100° C.

6. A method as claimed in claim 1 wherein the heat treatment is carried out for about 2 to 8 hours.

7. A method as claimed in claim 1 wherein the heat treatment is carried out at a pressure of from 0 to $10^{-3}$ mbar.

8. A method as claimed in claim 1 wherein the reducing agent is selected from calcium or magnesium.

9. A method as claimed in claim 1 wherein said organic solvent is acetone.

10. A method as claimed in claim 1 wherein the mixture of metal oxide and reducing agent is dried under vacuum prior to reduction.

11. A method as claimed in claim 1 wherein the metal oxide and the reducing agent are mixed in a ratio in the range of from 1:10 to 10:1.

12. A method as claimed in claim 11 wherein said ratio is from 1:5 to 4:1.

13. A method as claimed in claim 1 wherein the leaching treatment of the metal after reduction is performed at ambient temperatures of between 15 and 30° C.

14. A method as claimed in claim 1 wherein the leaching treatment of the metal after reduction is performed for between 30 minutes and 3 hours.

15. A method as claimed in claim 1 wherein said dilute aqueous acids are selected from inorganic acids.

16. A method as claimed in claim 1 wherein said dilute aqueous acid is used at concentrations of between 0.01 and 3M.

17. A method as claimed in claim 1 wherein said metal is titanium and said dilute aqueous acid is 0.01-0.05M hydrochloric acid.

18. A method as claimed in claim 1 wherein the washing treatment is performed at ambient temperatures of between 15 and 30° C.

19. A method as claimed in claim 15 wherein said inorganic acids are selected from the group consisting of hydrochloric, sulphuric, phosphoric, and nitric acids.

* * * * *